United States Patent
Hasegawa et al.

(10) Patent No.: US 10,796,210 B2
(45) Date of Patent: Oct. 6, 2020

(54) PLOTTER, METHOD FOR DRAWING WITH PEN CONTAINING LIQUID USING PLOTTER, AND PEN MOUNTABLE ON PLOTTER

(71) Applicant: BROTHER KOGYO KABUSHIKI KAISHA, Nagoya-shi, Aichi-ken (JP)

(72) Inventors: Katsuhisa Hasegawa, Kasugai (JP); Daisuke Abe, Nagoya (JP); Keiji Takimoto, Nagoya (JP)

(73) Assignee: BROTHER KOGYO KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/270,197

(22) Filed: Feb. 7, 2019

(65) Prior Publication Data

US 2019/0193420 A1    Jun. 27, 2019

Related U.S. Application Data

(63) Continuation of application No. PCT/JP2017/020941, filed on Jun. 6, 2017.

(30) Foreign Application Priority Data

Aug. 9, 2016 (JP) .................................. 2016-156907

(51) Int. Cl.
*B41J 2/49* (2006.01)
*B43L 13/00* (2006.01)
(Continued)

(52) U.S. Cl.
CPC ............ *G06K 15/4075* (2013.01); *B41J 2/49* (2013.01); *B43L 13/007* (2013.01);
(Continued)

(58) Field of Classification Search
CPC ...... B41J 2/49; B41J 2/005; B41J 2002/0052; B43L 13/007; G06K 15/1823; G06K 15/22; G06K 15/4075
See application file for complete search history.

(56) References Cited

U.S. PATENT DOCUMENTS

| 5,596,351 A | 1/1997 | Stapleton |
| 6,068,422 A | 5/2000 | Smith |

(Continued)

FOREIGN PATENT DOCUMENTS

| EP | 0551947 A1 | 7/1993 |
| JP | S59-118590 U | 8/1984 |

(Continued)

OTHER PUBLICATIONS

New U.S. Continuation Application filed concurrently herewith based on PCT/JP2017/020939 with international filing date of Jun. 6, 2017 (Client/Brother Ref. Nos. 16121BRF21 / 2016-02196US00).

(Continued)

*Primary Examiner* — Matthew Luu
*Assistant Examiner* — Kendrick X Liu
(74) *Attorney, Agent, or Firm* — K&L Gates LLP

(57) ABSTRACT

A plotter includes a mounting portion, a first movement mechanism, a second movement mechanism, a processor, and a memory. The mounting portion is configured to mount with a pen containing a liquid. The first movement mechanism is configured to relatively move the mounting portion and a workpiece in a movement direction. The second movement mechanism configured to relatively move the mounting portion and the workpiece in a direction intersecting the movement direction. The memory is configured to store computer-readable instructions that, when executed by the processor, instruct the processor to perform processes.

(Continued)

The processes include acquiring plot data, acquiring information relating to a remaining amount of the liquid of the pen, setting a relative movement speed of the mounting portion and the workpiece, and controlling the first movement mechanism and the second movement mechanism at the set movement speed, and performing drawing on the workpiece.

12 Claims, 10 Drawing Sheets

(51) Int. Cl.
| | |
|---|---|
| *B43L 13/02* | (2006.01) |
| *G06K 15/22* | (2006.01) |
| *G06K 15/00* | (2006.01) |
| *G06K 15/02* | (2006.01) |
| *B43M 11/06* | (2006.01) |
| *B41J 2/005* | (2006.01) |

(52) U.S. Cl.
CPC ............ *B43L 13/024* (2013.01); *B43M 11/06* (2013.01); *G06K 15/1823* (2013.01); *B41J 2002/0052* (2013.01); *G06K 15/22* (2013.01)

(56) References Cited

U.S. PATENT DOCUMENTS

| | | | | |
|---|---|---|---|---|
| 2005/0088473 | A1* | 4/2005 | Holstun | B41J 2/04528 |
| | | | | 347/17 |
| 2014/0182463 | A1* | 7/2014 | Muto | B41J 11/663 |
| | | | | 101/3.1 |
| 2015/0366317 | A1* | 12/2015 | Bitoh | A45D 29/00 |
| | | | | 132/73.5 |

FOREIGN PATENT DOCUMENTS

| | | | |
|---|---|---|---|
| JP | S60-228197 | A | 11/1985 |
| JP | S60-228197 | U | 11/1985 |
| JP | S62-154980 | U | 10/1987 |
| JP | H02-014198 | A | 1/1990 |
| JP | H02-310098 | A | 12/1990 |
| JP | H07-114369 | A | 5/1995 |
| JP | H07-200664 | A | 8/1995 |
| JP | H07-205592 | A | 8/1995 |
| JP | 08090786 | A * | 4/1996 |
| JP | H08-300885 | A | 11/1996 |
| JP | 09314857 | A * | 12/1997 |
| JP | H10-240484 | A | 9/1998 |
| JP | H11-208177 | A | 8/1999 |
| JP | 2002-233682 | A | 8/2002 |
| JP | 2005-313465 | A | 11/2005 |
| JP | 2008-068404 | A | 3/2008 |
| JP | 2008-196972 | A | 8/2008 |
| JP | 2009-119610 | A | 6/2009 |
| JP | 2013-220536 | A | 10/2013 |

OTHER PUBLICATIONS

International Search Report issued in connection with International Application No. PCT/JP2017/020939, dated Aug. 22, 2017. (5 pages).
International Search Report issued in connection with International Application No. PCT/JP2017/020941, dated Aug. 15, 2017. (5 pages).
International Preliminary Report on Patentability issued in connection with related International Patent Application No. PCT/JP2017/020939, dated Feb. 12, 2019. (9 pages).
International Preliminary Report on Patentability issued in connection with related International Patent Application No. PCT/JP2017/020941, dated Feb. 12, 2019. (7 pages).

* cited by examiner

PLOTTER, METHOD FOR DRAWING WITH PEN CONTAINING LIQUID USING PLOTTER, AND PEN MOUNTABLE ON PLOTTER

CROSS-REFERENCE TO RELATED APPLICATION

This application is a continuation application of International Application No. PCT/JP2017/020941, filed Jun. 6, 2017, which claims priority from Japanese Patent Application No. 2016-156907, filed on Aug. 9, 2016. The disclosure of the foregoing application is hereby incorporated by reference in its entirety.

BACKGROUND

The present disclosure relates to a plotter, a method for drawing with a pen containing a liquid using a plotter, and a pen mountable on a plotter.

A plotter is known with which an ink pen can be mounted. The plotter converts character data to a bold dot pattern and extracts coordinates of contour dots from the dot pattern. After that, the plotter draws the extracted contour pattern.

SUMMARY

In the ink pen, in accordance with a change in a remaining amount of ink contained in an ink tank, an air pressure in the tank changes and a supply amount of the ink to a pen tip changes. Therefore, with the known plotter, the thickness of a drawn line changes depending on the remaining amount of the ink of the pen mounted on the plotter.

Various embodiments of the broad principles derived herein provide a plotter, a method for drawing with a pen containing a liquid using a plotter, and a pen mountable on a plotter that are capable of reducing an influence of a remaining amount of the liquid contained in the pen on a thickness of a drawn line.

Embodiments provide a plotter that includes a mounting portion, a first movement mechanism, a second movement mechanism, a processor, and a memory. The mounting portion is configured to mount with a pen containing a liquid. The first movement mechanism is configured to relatively move the mounting portion and a workpiece in a movement direction. The movement direction is a direction for the mounting portion and the workpiece to move close to and away from each other. The second movement mechanism is configured to relatively move the mounting portion and the workpiece in a direction intersecting the movement direction by the first movement mechanism. The memory is configured to store computer-readable instructions that, when executed by the processor, instruct the processor to perform processes. The processes include acquiring plot data instructing a position at which drawing is performed on the workpiece using the pen, acquiring information relating to a remaining amount of the liquid of the pen, setting a relative movement speed of the mounting portion and the workpiece by the second movement mechanism, on the basis of the acquired information relating to the remaining amount, and controlling the first movement mechanism and the second movement mechanism on the basis of the acquired plot data and the set movement speed, relatively moving the workpiece and the mounting portion at the movement speed, and performing drawing on the workpiece.

Embodiments also provide a method for drawing with a pen containing a liquid using a plotter. The method includes a process of acquiring plot data instructing a position to draw on a workpiece using the pen containing the liquid, a process of acquiring information relating to a remaining amount of the liquid of the pen, a process of setting a relative movement speed of a mounting portion and the workpiece, on the basis of the acquired information relating to the remaining amount. The mounting portion is configured to mount with the pen containing the liquid. The method also includes a process of controlling a first movement mechanism and a second movement mechanism on the basis of the acquired plot data and the set movement speed, relatively moving the workpiece and the mounting portion at the movement speed, and performing drawing on the workpiece. The first movement mechanism is configured to relatively move the mounting portion and the workpiece in a movement direction. The movement direction is a direction for the mounting portion and the workpiece to move close to and away from each other. The second movement mechanism is configured to relatively move the mounting portion and the workpiece in a direction intersecting the movement direction by the first movement mechanism.

Embodiments further provide a pen mountable on a plotter. The pen includes a container portion containing a liquid adhesive, a window portion configured to allow visual recognition of a remaining amount of the liquid adhesive, and a scale provided on the window portion and indicating the remaining amount of the liquid adhesive.

BRIEF DESCRIPTION OF THE DRAWINGS

Embodiments will be described below in detail with reference to the accompanying drawings in which.

DETAILED DESCRIPTION

First and second embodiments of the present disclosure will be explained sequentially with reference to the drawings. The accompanying drawings are used to illustrate technological features that can be adopted by the present disclosure, and device configurations and the like described herein are merely explanatory examples and the present disclosure is not limited thereto.

A physical configuration of a plotter 1 that is common to first and second embodiments will be explained with reference to FIG. 1. In the explanation below, the lower left side, the upper right side, the lower right side, the upper left side, the upper side and the lower side in the perspective view of the plotter 1 in FIG. 1 respectively correspond to the left side, the right side, the front side, the rear side, the upper side and the lower side of the plotter 1. In other words, the extending direction of a main body cover 9 to be described later is the left-right direction. The surface on which an operation portion 50 is disposed is the upper surface of the plotter 1.

Figure 1:
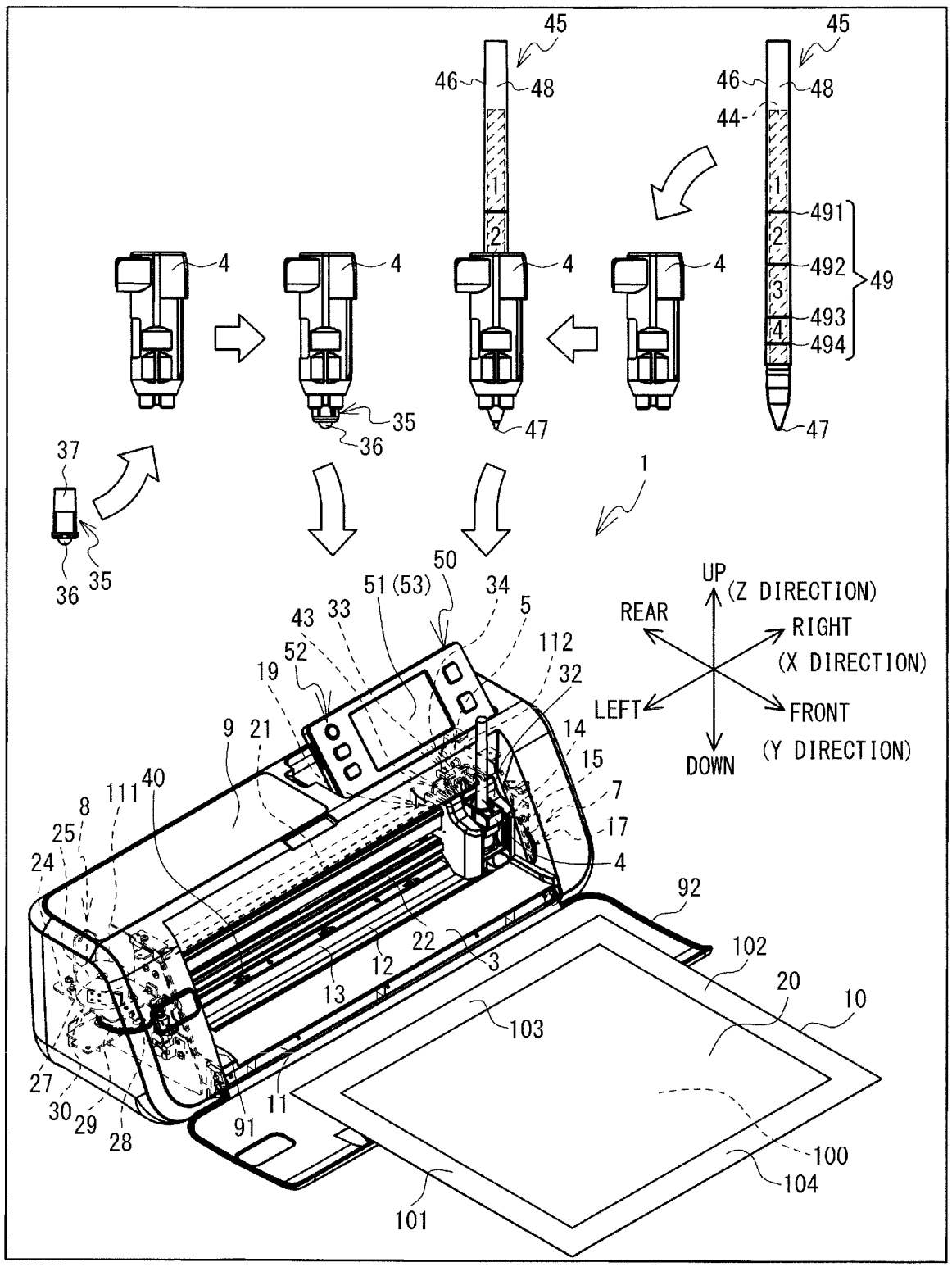
FIG. 1 shows a right side view of a pen and a pressing member that can be mounted on a plotter via a cartridge, and a perspective view of the plotter.

As shown in FIG. 1, the plotter 1 is a device that is configured to perform processing, including drawing and pressing, on a sheet-like workpiece 20. The workpiece 20 is a paper sheet or a resin sheet, for example. It is sufficient that the workpiece 20 is a workpiece on which a pattern can be drawn using a pen 45 to be described later. Further, the plotter 1 is configured to generate image data that represents an image on the upper surface of the workpiece 20. The plotter 1 is provided with the main body cover 9, the operation portion 50, a platen 3, a head 5, a scanner portion 6 (refer to FIG. 2), a Y movement mechanism 7, and an X movement mechanism 8.

The main body cover 9 is a substantially rectangular box-shaped housing that is long in the left-right direction. The main body cover 9 is provided with an opening portion 91 and a cover 92. The opening portion 91 is an opening provided in a front portion of the main body cover 9. The cover 92 is a plate-shaped member that is long in the left-right direction, and the opening portion 91 is supported on the lower end side of the cover 92 such that the opening portion 91 can be opened and closed. In FIG. 1, the cover 92 is opened and the opening portion 91 is open.

The operation portion 50 is provided on a right-side section of the upper surface of the main body cover 9. The operation portion 50 is provided with a liquid crystal display (LCD) 51, a plurality of operation switches 52 and a touch panel 53. An image including various items, such as commands, illustrations, setting values, messages and the like, may be displayed on the LCD 51. The touch panel 53 is provided on the front face of the LCD 51. A user may perform a pressing operation on the touch panel 53 using a finger or a stylus pen (hereinafter, this operation is referred to as a "panel operation"). The plotter 1 recognizes which item is selected in correspondence with a pressed position detected by the touch panel 53. Using the operation switches 52 and the touch panel 53, the user can perform selection of patterns displayed on the LCD 51, setting of various parameters, an input operation and the like.

The platen 3 is provided inside the main body cover 9. The platen 3 is a plate-shaped member that extends in the left-right direction. The platen 3 receives the lower surface of a holding sheet 10. The holding sheet 10 is set on the platen 3 when the opening portion 91 is open. The holding sheet 10 is a rectangular-shaped sheet. The holding sheet 10 is made of a synthetic resin material, for example. A pressure-sensitive adhesive layer 100, to which a pressure-sensitive adhesive has been applied, is provided on a substantially rectangular area on the inside of the upper surface of the holding sheet 10, excluding peripheral edge portions (a left edge portion 101, a right edge portion 102, a rear edge portion 103 and a front edge portion 104). The workpiece 20 is adhered to the pressure-sensitive adhesive layer 100 and is held. The workpiece 20 may be directly set on the platen 3, without being held on the holding sheet 10.

The head 5 is provided with a carriage 19, a mounting portion 32 and a Z movement mechanism 33. A cartridge 4 is configured to be attached to and detached from the mounting portion 32. A plurality of types of processing members that are used to process the workpiece 20 can be mounted in the cartridge 4. The processing members of the present embodiment are the pen 45 and a pressing member 35. The user can select the processing member that is appropriate for a type of the workpiece 20, a thickness of the workpiece 20, and a type of the processing, and can mount the selected processing member in the cartridge 4. The mounting portion 32 of the present embodiment is configured to mount with the pen 45 containing a liquid adhesive via the cartridge 4. The mounting portion 32 is configured to mount with the pressing member 35 via the cartridge 4. The mounting portion 32 of the present embodiment is configured to selectively mount with one of the pen 45 and the pressing member 35 via the cartridge 4. A plurality of cartridges may be simultaneously mounted on the mounting portion 32.

The Z movement mechanism 33 is configured to relatively move the mounting portion 32 and the workpiece 20 in a movement direction. The movement direction is a direction for the mounting portion 32 and the workpiece 20 to move close to and away from each other. The Z movement mechanism 33 of the present embodiment causes the mounting portion 32 and the cartridge 4 to move in the up-down direction (also referred to as a Z direction). The Z movement mechanism 33 is provided with a transmission mechanism 43 and a Z axis motor 34 (refer to FIG. 2). The transmission mechanism 43 reduces a speed of a rotary motion of the Z axis motor 34, converts the rotary motion to an up-and-down motion, and transmits the converted rotary motion to the mounting portion 32. When the Z axis motor 34 is driven, the cartridge 4 mounted on the mounting portion 32 moves between a lowered position and a raised position. The lowered position is a position of the cartridge 4 when the processing is performed on the workpiece 20. The raised position is a position at which the processing member is separated from the workpiece 20 by a predetermined distance.

The scanner portion 6 is configured to perform scan processing in accordance with a command from a CPU 2 to be described later. The scan processing is processing to generate the image data by the scanner portion 6 reading an image of a target object, such as the workpiece 20, held on the holding sheet 10. The scanner portion 6 is a contact image sensor (CIS), for example. Although not shown in the drawings, the scanner portion 6 is provided with a line sensor, a light source (a lamp) and a lens. The line sensor is provided on the lower surface of the scanner portion 6 and includes a plurality of imaging elements arranged side by side in the left-right direction (also referred to as an X direction) of the plotter 1. The scanner portion 6 is positioned to the rear of a guide rail 22 to be described later. The scanner portion 6 extends in the X direction and is provided facing downward. The dimension of the width of the holding sheet 10 in the X direction is substantially the same as the length of the scanner portion 6 (the line sensor) in the X direction. The scanner portion 6 reads an image on the upper surface of the target object when the upper surface of the target object held on the holding sheet 10 is in close proximity to the line sensor.

The Y movement mechanism 7 is configured to relatively move the mounting portion 32 and the workpiece 20 in a direction intersecting the Z direction, together with the X movement mechanism 8 to be described later. The Y movement mechanism 7 is configured to move the workpiece 20 with respect to the mounting portion 32 in a first direction intersecting the Z direction. The first direction of the present embodiment is the front-rear direction and the first direction is also referred to as a Y direction. The Y movement mechanism 7 of the present embodiment is configured to move the holding sheet 10 set on the platen 3 in the Y direction of the plotter 1. The Y movement mechanism 7 is provided with a drive roller 12, a pinch roller 13, an attachment frame 14, a Y axis motor 15 and a deceleration mechanism 17. The drive roller 12 and the pinch roller 13 are rotatably supported between a pair of side wall portions 111 and 112 of a machine frame 11 inside the main body cover 9. The drive roller 12 and the pinch roller 13 extend in the X direction and are disposed so as to be aligned in the up-down direction. Roller portions (not shown in the drawings) are respectively provided on a right portion and a left portion of the pinch roller 13. The attachment frame 14 is fixed on an outer surface side (the right side) of the side wall portion 112. The Y axis motor 15 is attached to the attachment frame 14. The Y axis motor 15 is a stepping motor, for example. An output shaft of the Y axis motor 15 is fixed to a drive gear (not shown in the drawings) of the deceleration mechanism 17. The drive gear meshes with a driven gear (not shown in the drawings). The driven gear is firmly fixed to the leading end of a right end portion of the drive roller 12.

When the holding sheet 10 is moved, the left edge portion 101 of the holding sheet 10 is clamped between the drive roller 12 and the roller portion provided on the left portion of the pinch roller 13. The right edge portion 102 of the holding sheet 10 is clamped between the drive roller 12 and the roller portion provided on the right portion of the pinch roller 13. When the Y axis motor 15 is driven to rotate forward or in reverse, the rotary motion of the Y axis motor 15 is transmitted to the drive roller 12 via the deceleration mechanism 17. Thus, the holding sheet 10 is moved rearward or forward. At this time, the roller portions of the pinch roller 13 do not come into contact with the workpiece 20 arranged on the holding sheet 10. The plotter 1 is provided with a roller 40 configured to press the workpiece 20 to the platen 3 side so that the workpiece 20 moved by the Y movement mechanism 7 does not come into contact with the scanner portion 6. The roller 40 is disposed on the rear side of the drive roller 12. In other words, the roller 40 is arranged further to an upstream side of the mounting portion 32 in the first direction.

The X movement mechanism 8 is configured to move the mounting portion 32 with respect to the workpiece 20 in a second direction that intersects the Z direction and the first direction (the Y direction). The second direction of the present embodiment is the left-right direction and the second direction is also referred to as the X direction. The movement direction of the mounting portion 32 of the present embodiment is orthogonal to the direction in which the holding sheet 10 configured to hold the workpiece 20 is moved by the Y movement mechanism 7. The X movement mechanism 8 is provided with a pair of upper and lower guide rails 21 and 22, an attachment frame 24, an X axis motor 25, a drive gear 27 and a driven gear 29 which serve as a deceleration mechanism, a transmission mechanism 30, and the like. The guide rails 21 and 22 are fixed between the side wall portions 111 and 112. The guide rails 21 and 22 are positioned above and slightly to the rear of the pinch roller 13. The guide rails 21 and 22 extend substantially parallel to the pinch roller 13, namely, in the X direction. The carriage 19 of the head 5 is supported by the guide rails 21 and 22 such that the carriage 19 can move in the X direction along the guide rails 21 and 22.

The attachment frame 24 is fixed close to the rear on the outer surface side (the left side) of the side wall portion 111. The X axis motor 25 is attached to the rear of the attachment frame 24 so as to face downward. The drive gear 27 is fixed to an output shaft of the X axis motor 25. The X axis motor 25 is a stepping motor, for example. The driven gear 29 meshes with the drive gear 27. The transmission mechanism 30 has a pair of left and right timing pulleys and an endless timing belt (not shown in the drawings) that is stretched between the pair of left and right timing pulleys. One of the timing pulleys (which is a timing pulley 28) is provided on the attachment frame 24 such that the timing pulley 28 can rotate integrally with the driven gear 29. The other timing pulley is provided on the attachment frame 14. The timing belt extends in the X direction and is coupled to the carriage 19. The X movement mechanism 8 converts the rotary motion of the X axis motor 25 to a motion in the X direction, and transmits the converted motion to the carriage 19. When the X axis motor 25 is driven to rotate forward or in reverse, the rotary motion of the X axis motor 25 is transmitted to the timing belt via the drive gear 27, the driven gear 29 and the timing pulley 28. As a result, the carriage 19 is moved to the left or to the right. Thus, the head 5 moves in the X direction.

The pen 45 that is configured to be mounted on the mounting portion 32 via the cartridge 4 will be explained with reference to FIG. 1. The pen 45 is a liquid adhesive application tool having a ballpoint pen-like shape. The pen 45 is provided with a container portion 46, a pen tip portion 47 and a window portion 48. The container portion 46 has a hollow circular cylindrical shape and contains a liquid adhesive 44 therein. It is sufficient that the liquid adhesive 44 has fluidity, can be contained in the container portion 46 of the pen 45, and can be caused to attach to the workpiece 20 using the pen 45. The liquid adhesive 44 is not limited to a liquid paste, and may be a liquid adhesive that includes synthetic resin, such as polyvinyl acetate, chloroprene rubber, urea resin, epoxy resin or the like. In the present embodiment, the word "adhesive" includes a pressure-sensitive adhesive. The liquid adhesive 44 of the present embodiment contains acrylic emulsion and is colored by a pigment that develops color when a volatile solvent, such as water, has a certain density or more. When a pattern is drawn on the workpiece 20 using the pen 45 of the present embodiment, while the density of the solvent of the liquid adhesive 44 attached to the workpiece 20 is the certain density or more, the user can visually recognize the drawn pattern owing to the pigment contained in the liquid adhesive 44. When the density of the solvent of the liquid adhesive 44 attached to the workpiece 20 is less than the certain density due to volatilization, the liquid adhesive 44 becomes transparent and colorless, and acrylic resin components contained in the liquid adhesive 44 are laminated on the workpiece 20.

The window portion 48 is provided on a side surface (an outer peripheral surface) of the container portion 46 and has optical transparency. The user can visually check a remaining amount of the liquid adhesive 44 via the window portion 48. In the container portion 46 of the present embodiment, the whole area of the side surface (the outer peripheral surface) of the container portion 46 forms the window portion 48. A scale 49 is provided on the container portion 46. The scale 49 of the present embodiment includes three or more lines 491 to 494. Each of the three or more lines 491 to 494 extends perpendicularly to an extending direction of the pen 45. Intervals between adjacent lines of the three or more lines 491 to 494 are different from each other. The intervals between the adjacent lines of the three or more lines 491 to 494 are set such that the closer to the pen tip portion 47, the narrower the interval therebetween, in comparison to when the adjacent lines are farther from the pen tip portion 47. The scale 49 of the present embodiment includes four lines, and the four lines are the lines 491 to 494 in descending order of distance from the pen tip portion 47. A numeric value representing the remaining amount of the liquid adhesive 44 contained in the pen 45 is printed on a side, of each of the lines 491 to 494, that is separated from the pen tip portion 47. The numeric values representing the remaining amount of the liquid adhesive 44 are 4, 3, 2, 1 in the order of closeness to the pen tip portion 47. When a liquid surface of the liquid adhesive 44 is between the line 494 and the line 493, the numeric value representing the remaining amount of the liquid adhesive 44 is 4. Similarly, when the liquid surface of the liquid adhesive 44 is between the line 493 and the line 492, the numeric value representing the remaining amount of the liquid adhesive 44 is 3. When the liquid surface of the liquid adhesive 44 is between the line 492 and the line 491, the numeric value representing the remaining amount of the liquid adhesive 44 is 2. As shown in FIG. 1, when the liquid surface of the liquid adhesive 44 is on the side that is separated further from the pen tip portion 47 than the line 491, the numeric value representing the remaining amount of the liquid adhesive 44 is 1.

The pen tip portion 47 has a conical shape and is coupled to one end of the container portion 46. The liquid adhesive 44 contained in the pen 45 is applied from the tip end of the pen tip portion 47. Although not shown in the drawings, the pen 45 of the present embodiment has various forms whose types are different from each other. The type of the pen 45 is set in accordance with a combination of a type of the liquid adhesive, a thickness of the pen tip, and a shape of the pen tip, for example. When the plurality of types of the pen 45 of the present embodiment are respectively mounted on the mounting portion 32 via the cartridge 4 and are respectively moved at the same speed by the plotter 1, the thicknesses of drawn lines are different from each other.

The pressing member 35 that is configured to be mounted on the mounting portion 32 via the cartridge 4 will be explained with reference to FIG. 1. The pressing member 35 is a member to press the workpiece 20, on which a foil sheet has been arranged, from above. The foil sheet is a sheet-shaped metallized foil for foil stamping processing. The metallized foil is obtained by depositing metal, such as aluminum (AL), on a resin film to which a parting agent is applied. The resin film is, for example, a polyethylene terephthalate (PET) film or a polyester (PES) film. The pressing member 35 of the present embodiment has a pressing portion 36 and a mounting portion 37. The pressing portion 36 is provided on a side that faces the workpiece 20, and is a semispherical portion made of a synthetic resin material. The mounting portion 37 is disposed at an end portion on a side opposite to the pressing portion 36 of the pressing member 35. When the mounting portion 37 is fitted into the cartridge 4 from below, the mounting portion 37 is detachably mounted in the cartridge 4. Although not shown in the drawings, the pressing member 35 of the present embodiment has various forms whose types are different from each other. The type of the pressing member 35 is set in accordance with a combination of a shape, a size and a material of the pressing portion 36, for example. When the plurality of types of the pressing member 35 of the present embodiment are respectively mounted on the mounting portion 32 via the cartridge 4 and the mounting portion 32 is moved to the lowered position, shapes and sizes of areas that come into contact with the workpiece 20 are different from each other.

Figure 2:
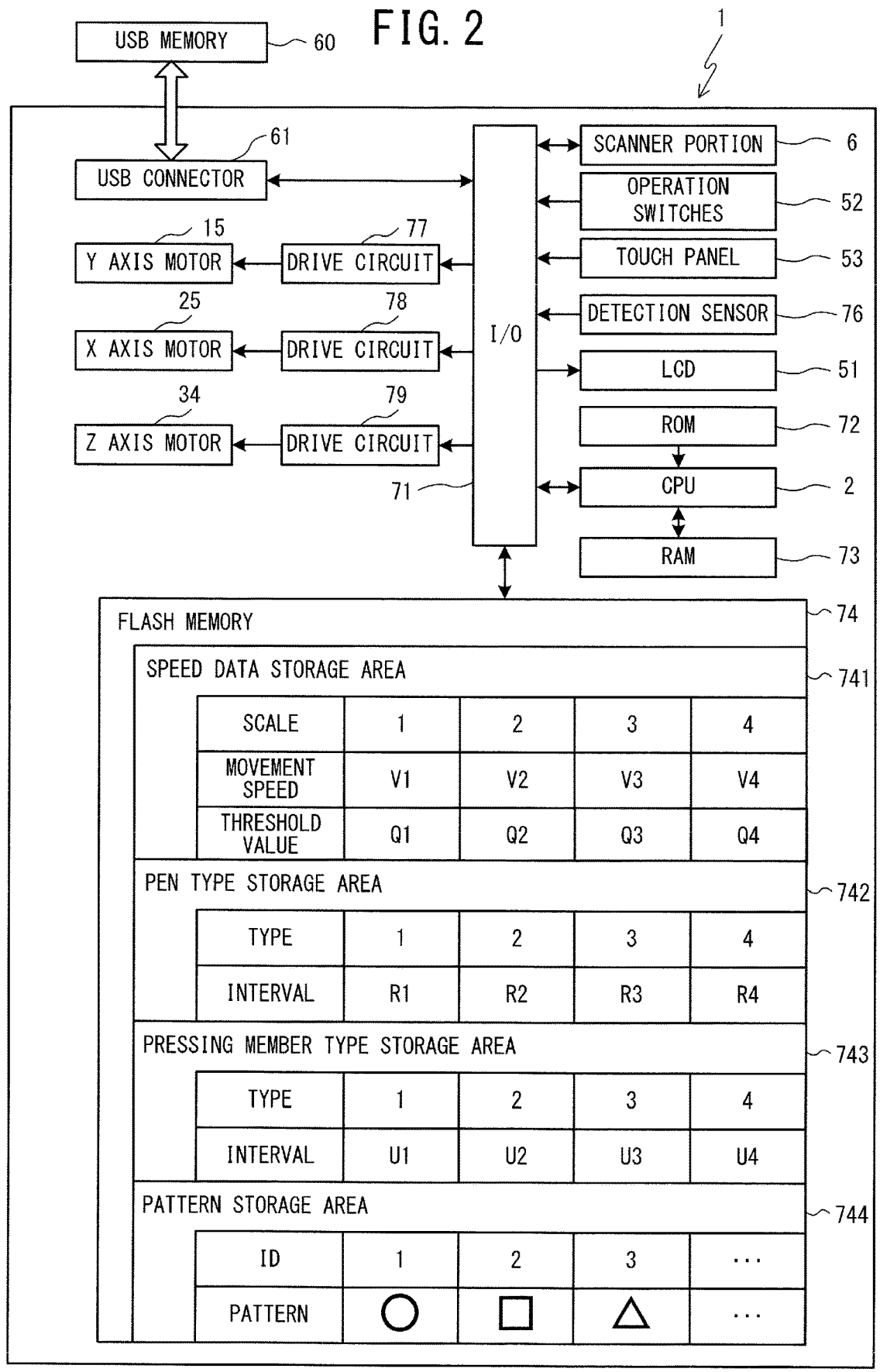
FIG. 2 is a block diagram showing an electrical configuration of the plotter.

An electrical configuration of the plotter 1 will be explained with reference to FIG. 2. As shown in FIG. 2, the plotter 1 is provided with the CPU 2, a ROM 72, a RAM 73 and an input/output (I/O) interface 71. The CPU 2 is electrically connected to the ROM 72, the RAM 73 and the I/O interface 71. The CPU 2 performs main control of the plotter 1. The ROM 72 stores various programs and the like used to operate the plotter 1. The programs include, for example, a program to cause the plotter 1 to perform drawing control processing and pressing control processing to be described later. The RAM 73 temporarily stores various programs, various data, setting values input by an operation on the operation switches 52, calculation results obtained through arithmetic processing by the CPU 2, and the like.

Further, a flash memory 74, the scanner portion 6, the operation switches 52, the touch panel 53, a detection sensor 76, the LCD 51, a USB connector 61 and drive circuits 77 to 79 are connected to the I/O interface 71. The flash memory 74 is a nonvolatile storage element that may store various parameters and the like. The flash memory 74 of the present embodiment has a plurality of storage areas including a speed data storage area 741, a pen type storage area 742, a pressing member type storage area 743 and a pattern storage area 744.

The speed data storage area 741 stores the numeric value representing the remaining amount of a liquid contained in the pen 45, and a movement speed corresponding to the numeric value. It is sufficient that the liquid is a material having fluidity that allows drawing by the pen 45, and the liquid is ink, water or liquid adhesive, for example. In the present embodiment, the liquid is the liquid adhesive 44. The speed data storage area 741 of the present embodiment stores a plurality of sets of correspondences between the numeric value of the scale 49 of the pen 45, the movement speed, and a threshold value. The numeric value representing the remaining amount of the liquid contained in the pen 45, and the movement speed corresponding to the numeric value may be represented by a mathematical expression. The numeric value of the scale 49 is the numeric value representing the remaining amount of the liquid adhesive 44 contained in the pen 45, and is one of the values from 1 to 4 as described above. The movement speed is a relative movement speed (a limited movement speed) of the mounting portion 32 with respect to the workpiece 20. The movement speed is denoted as V1, V2, V3 and V4 in descending order of the movement speed. The movement speed of the present embodiment is defined for each of the Y movement mechanism 7 and the X movement mechanism 8. The movement speed may be a speed obtained by combining the movement speed of the Y movement mechanism 7 and the movement speed of the X movement mechanism 8. The threshold value is a numeric value that is used when determining whether to change the relative movement speed of the workpiece 20 and the mounting portion 32 in accordance with a distance of the line that is drawn using the liquid during execution of the drawing control processing to be described later. The threshold value is denoted as Q1, Q2, Q3 and Q4 in descending order of the value. In other words, the larger the remaining amount of the liquid, the larger the threshold value of the present embodiment, in comparison to when the remaining amount of the liquid indicated by the information relating to the remaining amount is smaller.

The pen type storage area 742 stores a plurality of sets of correspondences between the type of the pen 45 mounted on the mounting portion 32 and an interval. The type of the pen 45 of the present embodiment is represented by one of numeric values 1 to 4. When the pen 45 mounted on the mounting portion 32 is used to draw a pattern using the liquid adhesive 44, the interval is a numeric value that defines an interval between the drawing line representing the contour of the pattern and an offset area on the inside of the contour of the pattern. The interval of the present embodiment is determined in advance for each of the types of the pen 45, on the basis of a reference line thickness (0.3 mm when the pen type is 1, for example). The reference line thickness may be set in advance in accordance with a predetermined condition. For example, the reference line thickness is an average value of thicknesses of the line when the line is drawn at a constant speed from when the not yet used pen 45 is mounted on the mounting portion 32 to when the liquid adhesive 44 contained in the pen 45 is used up. The interval is preferably 0.3 to 0.7 times the reference line thickness. The interval of the present embodiment is half the reference line thickness (0.15 mm when the pen type is 1, for example). The pressing member type storage area 743 stores a plurality of sets of correspondences between the type of the pressing member 35 mounted on the mounting portion 32 and an interval. The type of the pressing member 35 of the present embodiment is represented by one of numeric values from 1 to 4. When the workpiece 20 is pressed using the pressing member 35 mounted on the mounting portion 32, the interval is a numeric value that defines an interval between adjacent line segments of a plurality of line segments included in a pressing line. The pressing line is set in a pressing area and is a line indicating a position of the center of the pressing by the pressing member 35. The center of the pressing member 35 of the present embodiment is the leading end (the lower end) of the semispherical pressing portion 36. The interval between the plurality of line segments included in the pressing line is set in advance for each of the types of the pressing member 35, in accordance with the size and shape etc. of an area over which the pressing member 35 mounted on the mounting portion 32 and the workpiece 20 are in contact when the mounting portion 32 is in the lowered position. The pattern storage area 744 stores a plurality of sets of correspondences between an ID to identify the pattern and pattern data relating to the pattern that is used in the drawing control processing to be described later. The pattern data indicates the shape of the pattern that is drawn on the workpiece 20 using the pen 45 mounted in the cartridge 4.

The CPU 2 controls the scanner portion 6 and causes the above-described scan processing to be performed, thus acquiring the image data. The detection sensor 76 detects the leading end of the holding sheet 10 set on the platen 3. A detection signal of the detection sensor 76 is input to the CPU 2. The CPU 2 controls the LCD 51 and causes an image to be displayed. The LCD 51 can perform notification of various commands. A USB memory 60 can be connected to the USB connector 61. In a state in which the USB memory 60 is connected to the USB connector 61, the CPU 2 can access each of storage areas provided in the USB memory 60. The drive circuits 77 to 79 drive the Y axis motor 15, the X axis motor 25 and the Z axis motor 34, respectively. On the basis of plot data to be described later, the CPU 2 controls the Y axis motor 15, the X axis motor 25 and the Z axis motor 34 and the like and causes the processing with respect to the workpiece 20 on the holding sheet 10 to be performed automatically.

An overview of a foil stamping processing method when the foil stamping processing method is performed on the workpiece 20 using the plotter 1 will be explained with reference to FIG. 3. A case in which the foil stamping processing of a pattern 64 is performed on the workpiece 20 will be explained as an example. The pattern 64 includes, as partial patterns, a circular pattern 62 and a rectangular pattern 63 that is long in the left-right direction. The up-down direction and the left-right direction in FIG. 3 respectively correspond to the Y direction and the X direction of the plotter 1.

Figure 3:
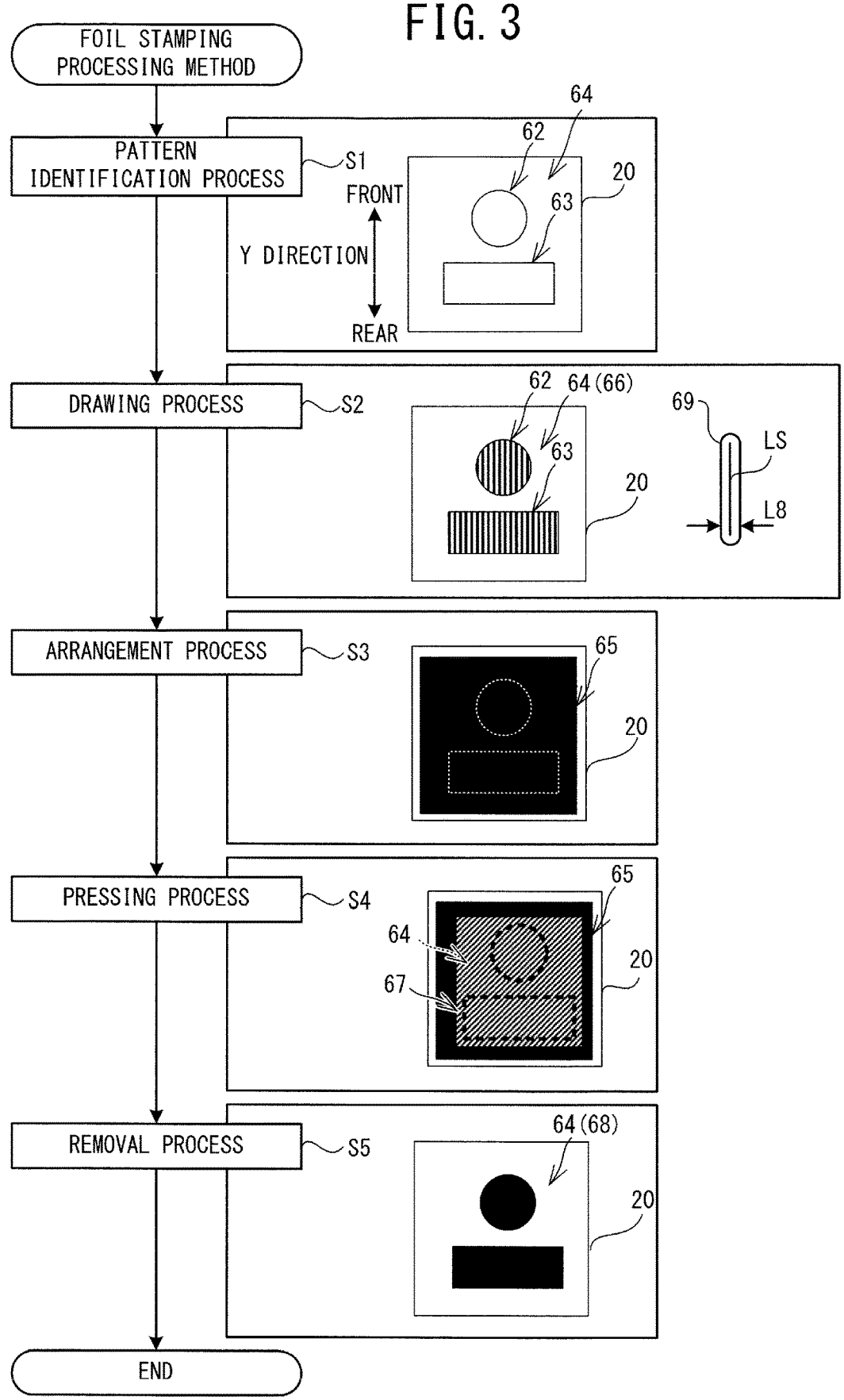
FIG. 3 is a flowchart of a foil stamping processing method.

As shown in FIG. 3, the pattern to be foil stamped on the workpiece 20 is identified (S1). In a process at S1, for example, from among the patterns stored in the pattern storage area 744 of the plotter 1, the pattern selected by the user performing a panel operation is identified as the pattern 64 to be foil stamped. In the process at S1, the pattern 64 may be identified on the basis of the image data obtained by the scan processing using the scanner portion 6, for example. When the scan processing is performed using the plotter 1, the CPU 2 drives the Y movement mechanism 7 and the scanner portion 6 in a state in which the cartridge 4 is held in the raised position. The upper surface of the target object held on the holding sheet 10 is read out while the holding sheet 10 and the scanner portion 6 are relatively moving in the Y direction, and the image data representing the image on the upper surface of the target object is generated. In the process at S1, the pattern may be acquired from an external device via a USB memory or the like, for example. The pattern may be a pattern drawn by the user performing a panel operation.

The pattern 64 to be foil stamped that is identified by the process at S1 is drawn using the pen 45 that contains the liquid adhesive 44 (S2). In the process at S2, the pen 45 is mounted on the mounting portion 32 via the cartridge 4. In accordance with the plot data, the CPU 2 drives the Y movement mechanism 7 and the X movement mechanism 8, and moves a relative position of the workpiece 20 and the mounting portion 32 to a drawing start position. After that, the CPU 2 drives the Z movement mechanism 33 and moves the cartridge 4 to the lowered position. The plot data is data instructing the movement of the Y movement mechanism 7, the X movement mechanism 8, and the Z movement mechanism 33. The movement of the Y movement mechanism 7 and the X movement mechanism 8 is instructed using coordinate data that indicates coordinates of an XY coordinate system that indicates the relative position of the workpiece 20 and the mounting portion 32. The plot data will be described in detail later. When the cartridge 4 is in the lowered position, the leading end of the pen tip portion 47 of the pen 45 mounted in the cartridge 4 is in contact with the upper surface of the workpiece 20. In this state, the CPU 2 drives the Y movement mechanism 7 and the X movement mechanism 8 in accordance with the plot data, and relatively moves the workpiece 20 and the mounting portion 32 in the Y direction and the X direction that intersect the Z direction. Thus, the pattern 64 identified by the process at S1 is drawn on the workpiece 20 using the liquid adhesive 44. When a line segment LS indicated by the plot data is drawn, the liquid adhesive 44 is applied to an area 69 that surrounds the line segment LS, in accordance with a thickness L8 of the pen tip portion 47. It is preferable that the plot data be set while taking account of the thickness L8 of the line segment to be drawn. In the present embodiment, the liquid adhesive 44 is applied to the contour of the pattern 64 on the workpiece 20 and an area on the inside of the contour, as in drawing areas 66 shown by vertical line hatching.

A foil sheet 65 is arranged on the workpiece 20 on which the pattern 64 has been drawn using the liquid adhesive 44 (S3). In the process at S3, for example, after the solvent of the liquid adhesive 44 applied onto the workpiece 20 decreases and the color development of the pigment of the liquid adhesive 44 disappears, the foil sheet 65 is arranged on the workpiece 20 by the user. The drawing areas 66 to which the liquid adhesive 44 has been applied by the plotter 1 are covered by the foil sheet 65. The pressing force by the pressing member 35 is dispersed appropriately. In order to inhibit the foil from being damaged by the pressing member 35, a resin protective sheet to cover the foil sheet 65 may be arranged if necessary.

A pressing area 67 on the workpiece 20 on which the foil sheet 65 has been arranged at S3 is pressed by the pressing member 35 (S4). The pressing area 67 includes the drawing areas 66 in which the pattern 62 and the pattern 63 of the pattern 64 have been respectively drawn using the liquid adhesive 44. In the process at S4, when the pressing control processing is performed using the plotter 1, the pressing member 35 is mounted on the mounting portion 32 via the cartridge 4. In accordance with the plot data, the CPU 2 drives the Y movement mechanism 7 and the X movement mechanism 8 to move the relative position of the workpiece 20 and the mounting portion 32 to a pressing start position. After that, the CPU 2 drives the Z movement mechanism 33 and moves the cartridge 4 to the lowered position. The pressing portion 36 of the pressing member 35 presses the workpiece 20 on the holding sheet 10 from above the foil sheet 65. In this state, the CPU 2 drives the Y movement mechanism 7 and the X movement mechanism 8 in accordance with the plot data, and relatively moves the workpiece 20 and the mounting portion 32 in the Y direction and the X direction. Since the leading end shape of the pressing portion 36 of the present embodiment is the semispherical shape, the workpiece 20 and the mounting portion 32 can move smoothly relative to each other, in comparison to when the leading end shape is an angular shape. The plotter 1 uses the pressing member 35 to press the pressing area 67 having the shape indicated by the plot data. Thus, the foil sheet 65 is adhered to the drawing areas 66 drawn using the liquid adhesive 44.

After the pressing process, the foil sheet 65 is peeled off from the workpiece 20, and foil strips attached to an area other than the drawing areas 66 of the workpiece 20 are removed (S5). In the process at S5, when the foil sheet 65 is peeled off from the workpiece 20 by the user from an end portion thereof, the foil of the drawing areas 66 drawn using the liquid adhesive 44 remains on the workpiece 20. The user removes unnecessary foil attached to the vicinity of the contour of the pattern 64 if necessary, using a brush, a silicon rubber sheet or the like. Through the processes described above, a foil 68 is adhered to the workpiece 20 in the shape of the pattern 64, and the foil stamping processing ends.

Figure 4:
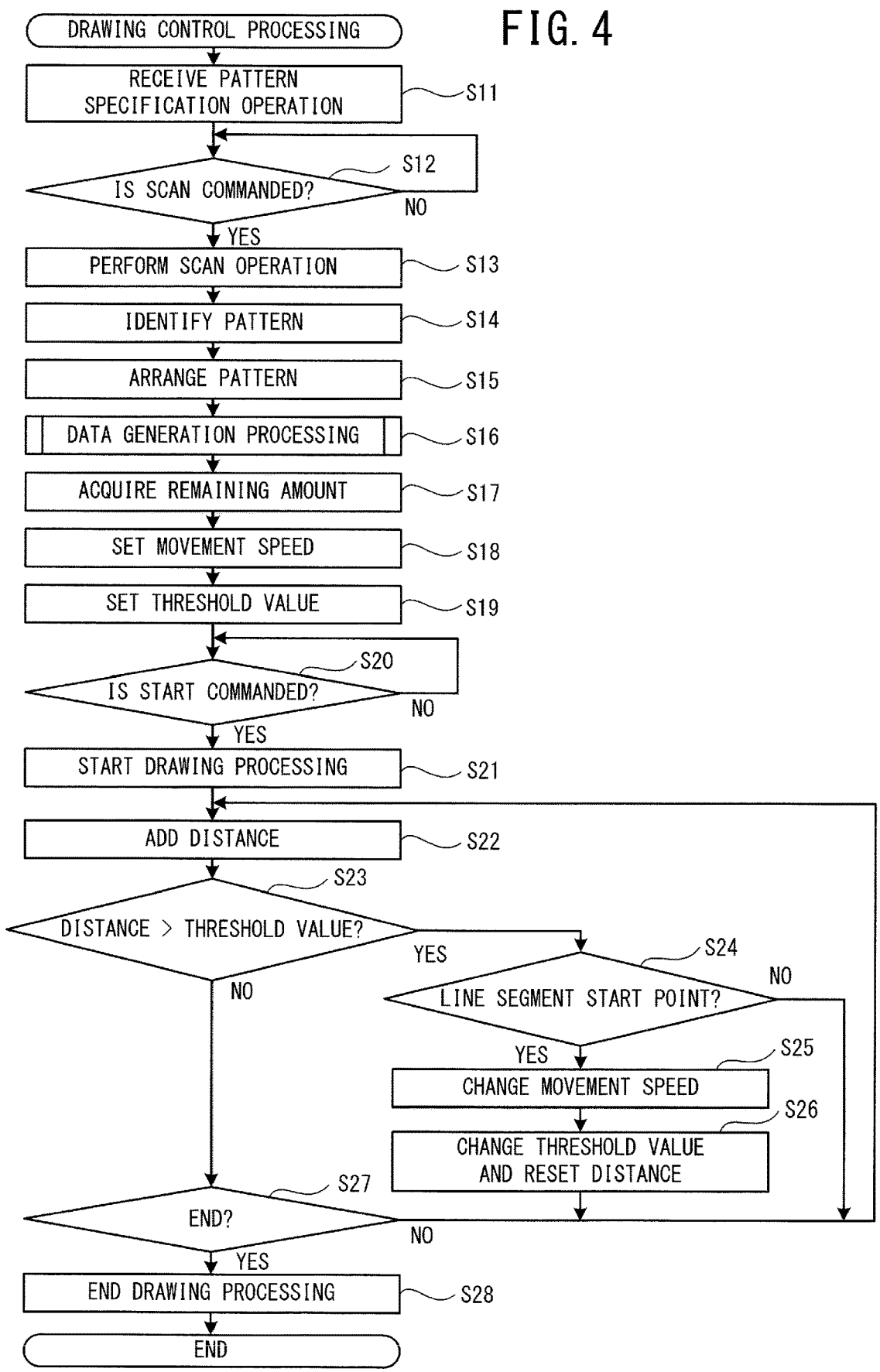
FIG. 4 is a flowchart of drawing control processing.
Figure 5:
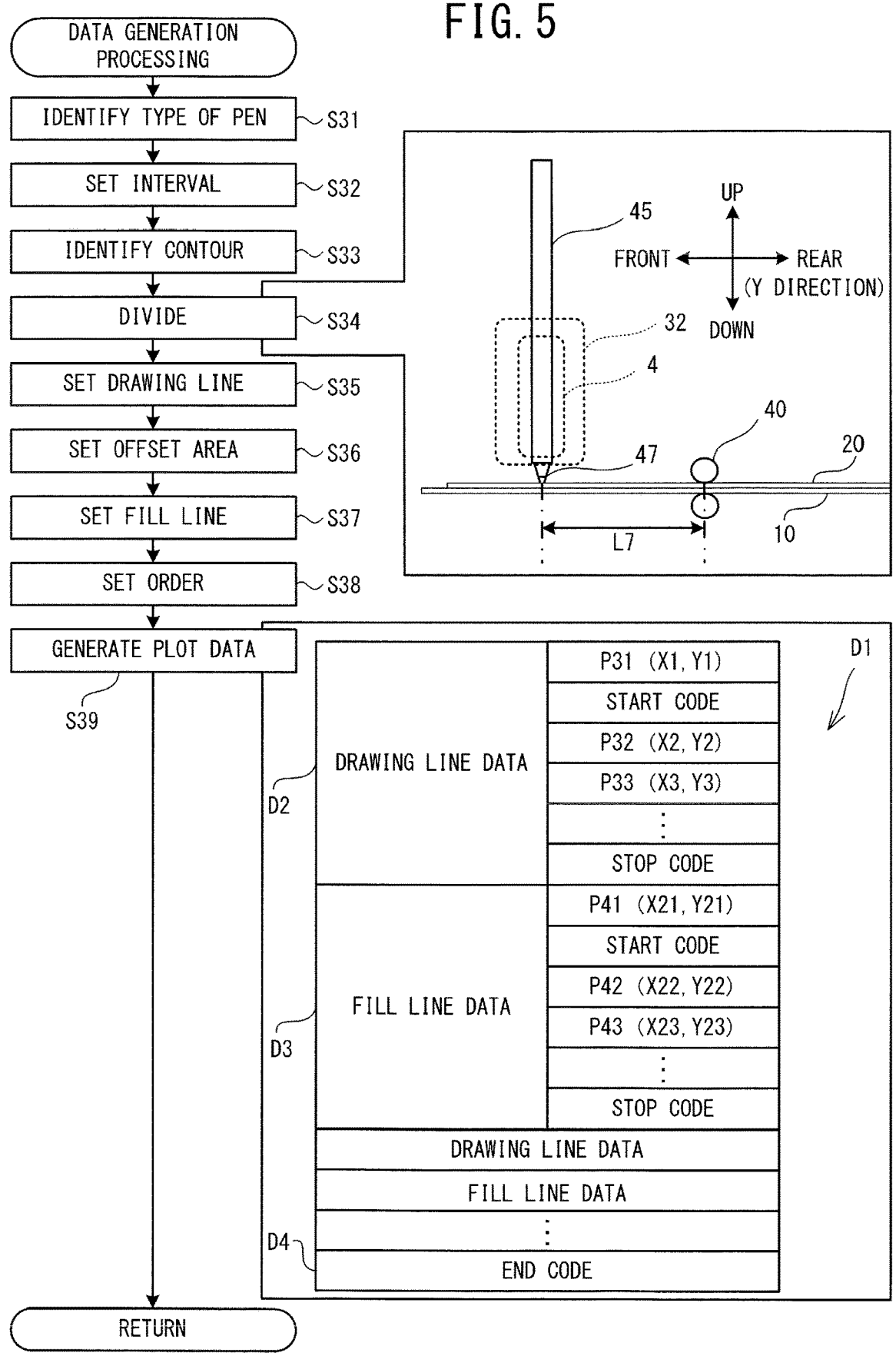
FIG. 5 is a flowchart of data generation processing that is performed in the drawing control processing shown in FIG. 4.
Figure 6:
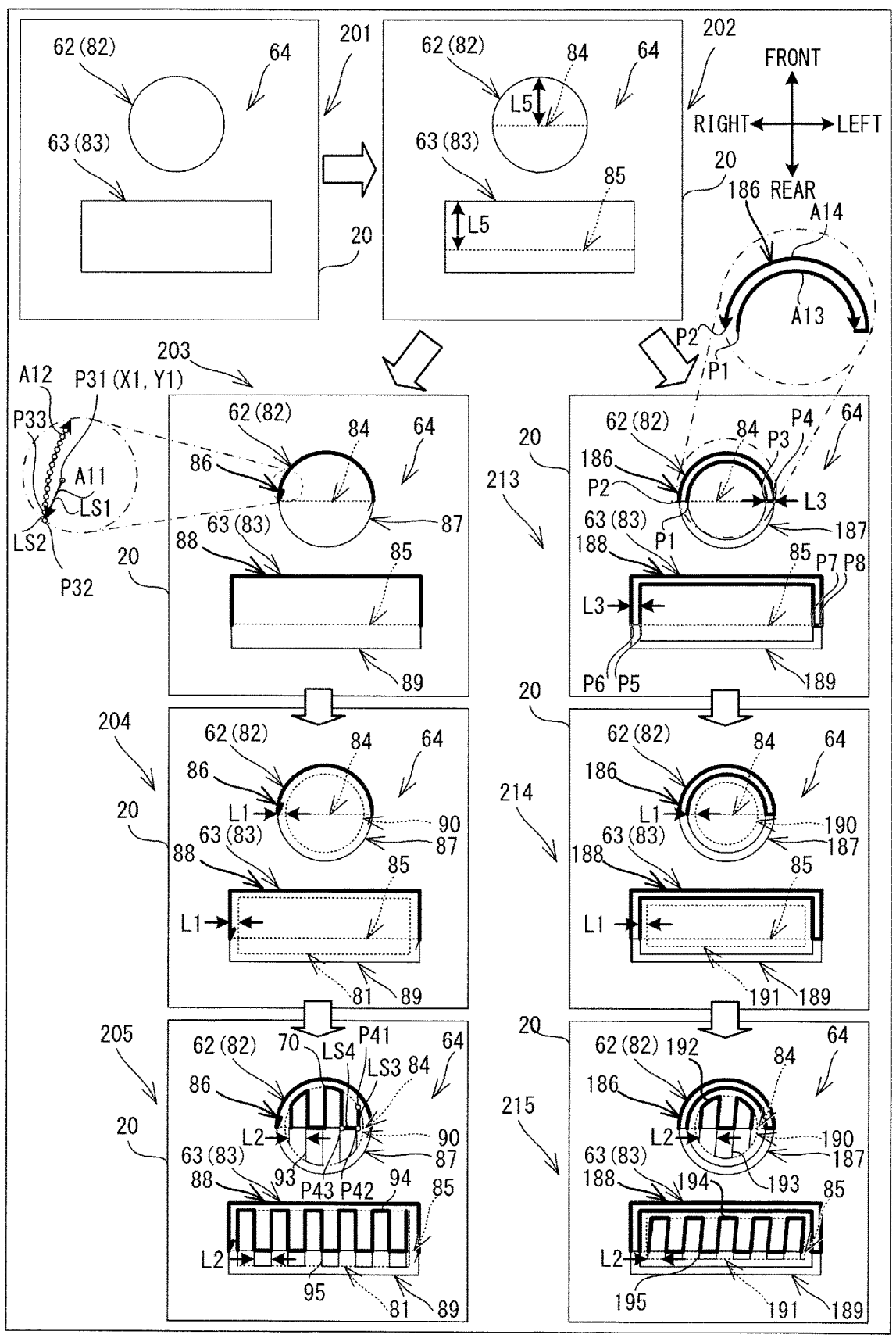
FIG. 6 is an explanatory diagram of a process to generate plot data instructing a drawing position of a pattern of a specific example.
Figure 7:
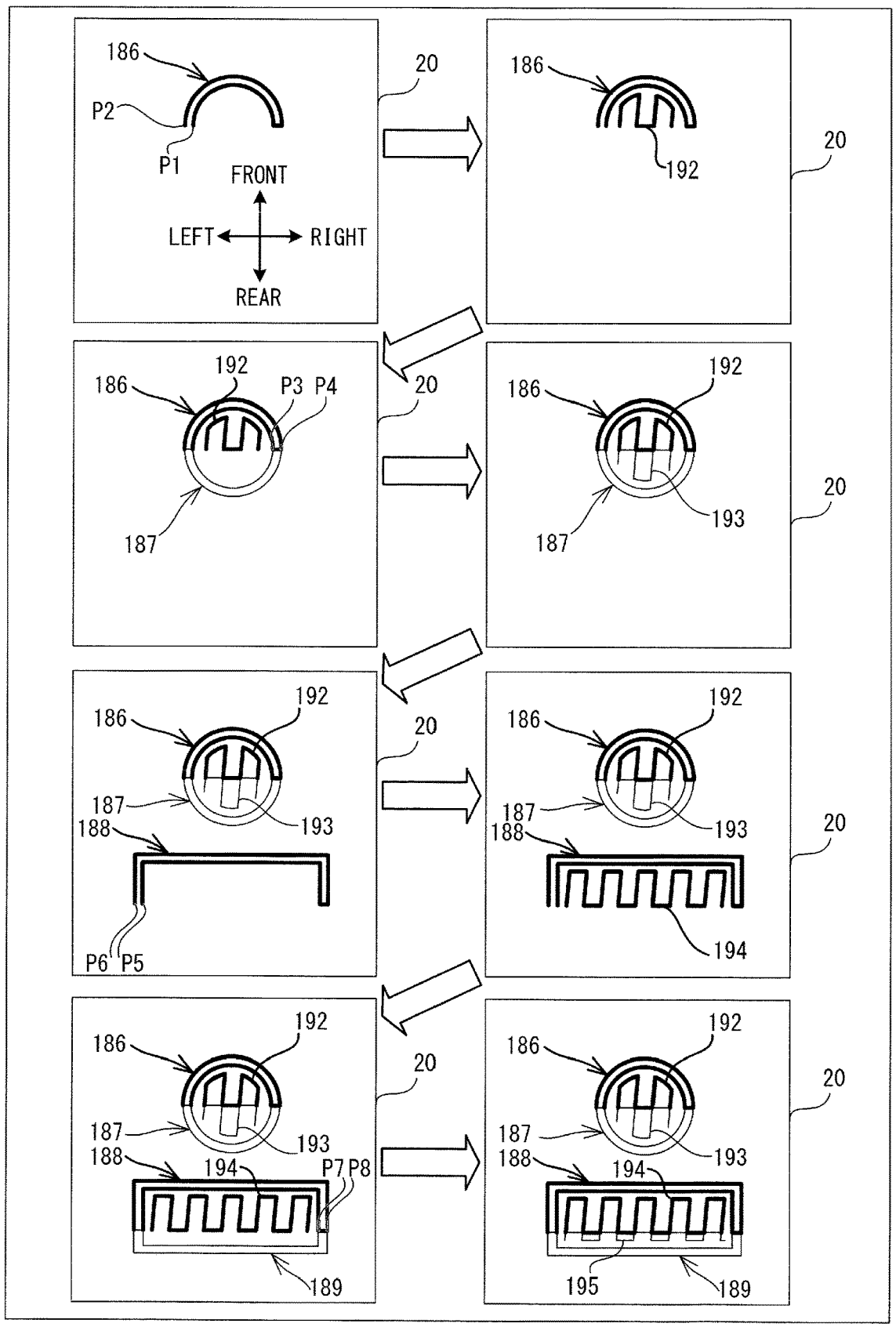
FIG. 7 is an explanatory diagram of a drawing order when the pattern of the specific example is drawn using the pen.

The drawing control processing and the pressing control processing of the above-described foil stamping processing method that are performed by the plotter 1 of the first embodiment will be explained with reference to FIG. 4 to FIG. 9. When a start command is received, the CPU 2 performs the drawing control processing shown in FIG. 4 on the basis of the program stored in the ROM 72. In the present embodiment, when the start command is input by a panel operation, the CPU 2 determines that the command to start the processing has been received. The start command may be input by another method. For example, the CPU 2 may determine that the start command has been received when a particular switch of the plurality of operation switches 52 is depressed. As an example, a case will be explained in which the pattern 64 shown in FIG. 3 is foil stamped on the workpiece 20. The up-down direction and the left-right direction in FIG. 6 and FIG. 7 respectively correspond to the Y direction and the X direction of the plotter 1. In the specific example, it is assumed that the reference line thickness of the pen 45 is 0.3 mm. FIG. 6 and FIG. 7 schematically show drawing lines and fill lines represented by the plot data. The interval between each of the lines does not represent an interval and a line thickness of actual drawing lines and fill lines.

The CPU 2 receives, from the user, specification of the pattern to be foil stamped on the workpiece 20 (step S11). In the present embodiment, the user performs a panel operation and selects a target pattern as a target for the foil stamping processing, from among the patterns stored in the pattern storage area 744. The CPU 2 receives the pattern input by the panel operation as the target pattern. The CPU 2 determines whether or not a scan command has been input (step S12). The scan command is a command to start the scan processing of the workpiece 20 by the scanner portion 6. The user causes the workpiece 20 to be held on the holding sheet 10 and sets the holding sheet 10 on the platen 3. After that, the user inputs the scan command by performing a panel operation. When the scan command has not been input (no at step S12), the CPU 2 stands by until the scan command has been input. When the scan command has been input (yes at step S12), the CPU 2 drives the scanner portion 6 and the drive circuit 77 and scans the workpiece 20 held on the holding sheet 10 (step S13). The plotter 1 of the present embodiment causes the LCD 51 to display an image obtained by overlapping and arranging the pattern 64 received at step S11 on an image obtained by scanning the workpiece 20 to be processed by the foil stamping processing. Thus, the user can set the arrangement of the pattern 64 with respect to the workpiece 20 while confirming a finished image after the processing on the image. The processing at step S12 and step S13 may be omitted if necessary.

The CPU 2 identifies the pattern to be processed on the workpiece 20 (step S14). In the specific example, the pattern 64 received at step S11 is identified as the pattern to be processed on the workpiece 20. The CPU 2 sets the arrangement of the identified pattern 64 on the workpiece 20 (step S15). While checking the LCD 51, the user performs a panel operation and inputs a command to specify the arrangement of the pattern 64. The CPU 2 sets the arrangement of the pattern 64 on the workpiece 20 on the basis of the command input by the panel operation. The arrangement of the pattern may be set using another method and, for example, may be set on the basis of coordinates input by the user.

The CPU 2 performs data generation processing (step S16). In the data generation processing, the CPU 2 performs processing to generate the plot data. As shown in FIG. 5, the CPU 2 identifies the type of the pen 45 that is mounted on the mounting portion 32 (step S31). At step S31, the CPU 2 receives an input of information relating to the type of the pen 45 mounted on the mounting portion 32 from the user, and identifies the type of the pen 45 on the basis of the input information. The information relating to the type of the pen 45 of the present embodiment is the numeric values represented by the integers from 1 to 4 shown in the pen type storage area 742 in FIG. 2. The type of the pen 45 may be identified by another method and, for example, may be identified automatically on the basis of information acquired by wireless communication from a radio frequency (RF) tag in which ID information assigned to the pen 45 is embedded.

The CPU 2 sets a first predetermined amount L1 on the basis of the type of the pen 45 identified at step S31 (step S32). The first predetermined amount L1 is an interval between the drawing line of the pattern identified by the processing at step S14 and the offset area. The CPU 2 of the present embodiment refers to the pen type storage area 742 and sets, as the first predetermined amount L1, the interval corresponding to the type of the pen 45 identified at step S31. For example, when the type of the pen 45 is 1, the CPU 2 sets R1 as the first predetermined amount L1. The CPU 2 identifies the contour of the pattern 64 to be processed on the workpiece 20 (step S33). The contour of the pattern 64 may be identified using a known technique. The CPU 2 of the present embodiment identifies the contour of the pattern on the basis of the pattern data of the pattern identified at step S14 and the arrangement of the pattern set at step S15. In the specific example, as shown by a state 201 in FIG. 6, contours 82 and 83 are identified for the patterns 62 and 63, respectively.

The CPU 2 divides the areas surrounded by the contours 82 and 83 identified at step S33 into a plurality of divided areas (step S34). In the first direction (the Y direction), the CPU 2 of the present embodiment divides the areas surrounded by the contours 82 and 83 into the plurality of divided areas, at an interval L5 that is smaller than a distance L7 (refer to FIG. 5) between a position at which the roller 40 comes into contact with the workpiece 20 and a position at which the pen 45 mounted on the mounting portion 32 comes into contact with the workpiece 20. In the specific example, as shown by a state 202, the area surrounded by the contour 82 is divided into two divided areas by a dividing line segment 84 that extends in the second direction orthogonal to the first direction. The dividing line segment 84 is set at a position determined by the interval L5 from the front end of the contour 82. The distance from the dividing line segment 84 to the rear end of the contour 82 is equal to or less than the interval L5. The area surrounded by the contour 83 is divided into two divided areas by a dividing line segment 85. The dividing line segment 85 is set at a position determined by the interval L5 from the front end of the contour 83. The distance from the dividing line segment 85 to the rear end of the contour 83 is equal to or less than the interval L5. The reason for setting the divided areas in this manner is to allow the plotter 1 to draw the pattern on the workpiece 20 using the pen 45, without the roller 40 coming into contact with the drawing area on the workpiece 20 drawn using the liquid adhesive 44. When the pinch roller 13 disposed to the front of the roller 40 comes into contact with the workpiece 20, the interval L5 may be set to be smaller than the distance between a position at which the pinch roller 13 comes into contact with the workpiece 20 and a position at which the pen 45 mounted on the mounting portion 32 comes into contact with the workpiece 20. A reference point to set the dividing line segment 84 is not limited to the front end of the contour of the pattern (the partial pattern) in the first direction, as in the present embodiment. The reference point may be an end portion, in the first direction, of the contour of the pattern or the workpiece 20, or may be set at a given position by the user.

The CPU 2 sets, for each of the divided areas set at step S34, the drawing line representing the contour identified at step S33 (step S35). At step S35, the CPU 2 sets a drawing position and a writing order (a start point and an end point) of the drawing line. The CPU 2 of the present embodiment sets the start point of the drawing line on an inward side of the contour, relative to the contour identified at step S33. The inward side of the contour is a direction toward an inner section of a closed area surrounded by the contour. For example, with respect to the pattern 62, the inward side of the contour is a direction from the contour 82 toward the center of the circle represented by the pattern 62. With respect to the pattern 63, the inward side of the contour is a direction from the contour 83 toward an intersection point of diagonal lines of the rectangle represented by the pattern 63. Although not shown in the drawings, when the pattern is a doughnut-shaped pattern whose contours are two circles, the inward side of the contour is a direction toward an area between the two circles. An outward side of the contour is a direction opposite to the inward side of the contour, and is a direction from the inner section of the closed area surrounded by the contour toward the outside of the contour. The drawing line is represented by a line that is drawn with a single stroke, for example. The CPU 2 of the present embodiment changes the setting method of the drawing line in accordance with the thickness of the contour represented by the drawing line. The thickness of the contour may be set by the user or may be automatically set in accordance with the type of the liquid adhesive, the shape of the pattern, and the like.

When the thickness of the contour represented by the drawing line is set to be the same as the thickness L8 of the line segment LS to be drawn by the pen 45 (hereinafter referred to as a case of a first condition), the CPU 2 sets the drawing line to be a single line, and sets the start point of the drawing line to be on the inward side of the contour, relative to the contour identified at step S33. In the specific example, as shown by a state 203, the CPU 2 sets drawing lines 86 and 87 for the respective divided areas for the contour 82 of the pattern 62. The drawing lines 86 and 87 are set on the contour 82. While taking account of the thickness of a single line drawn by the pen 45 mounted on the mounting portion 32, the drawing lines 86 and 87 may be set to the inside of the contour 82 by the thickness of the line (the first predetermined amount L1). Drawing lines 88 and 89 are set for the respective divided areas for the contour 83 of the pattern 63. With respect to the drawing line 86, a section indicated by an arrow A11 from a start point P31 is arranged to be on the inward side of a section along the contour 82 indicated by an arrow A12. On the inward side of the contour, a line segment LS1 is parallel with respect to a part of a line segment group, such as a line segment LS2, along the contour 82 shown by the arrow A12. More specifically, the drawing line 86 includes a plurality of line segments (the line segment LS1 and the line segment LS2, for example) that are arranged parallel to each other on the inward side of the contour and in line with the contour 82. Since the thickness of the line drawn by the pen 45 is not stable immediately after the start of drawing, the section indicated by the arrow A11 is set so that the contour can be drawn using the drawing line in a state in which the drawing can be performed with a stable line thickness. It is preferable that the position of the start point P31 is set to a position whose distance from the contour 82 is within the first predetermined amount L1, and that the section indicated by the arrow A11 does not overlap with the offset area to be described later. The start point P31 may be set on the contour 82, the section indicated by the arrow A11 may pass though the contour 82, and the section indicated by the arrow A11 may overlap with the section indicated by the arrow A12.

When the thickness of the contour represented by the drawing line is set to be thicker than the thickness L8 of the line segment LS drawn by the pen 45 (hereinafter referred to as a case of a second condition), the CPU 2 sets the drawing line as a line including a plurality of line segments that are arranged parallel to each other on the inward side of the contour and in line with the contour. More specifically, the CPU 2 represents the contour using a plurality of line segment groups that extend in parallel with each other on the inward side of the contour and in line with the contour. A single line segment group includes one or more line segments. When a single line segment group includes a plurality of line segments, the plurality of line segments included in the single line segment group are continuous. The CPU 2 of the present embodiment forms a single drawing line by connecting the plurality of line segment groups using line segments extending on the inward side of the contour. When the contour of each of the divided areas has an annular shape, a spiral drawing line is set. When the contour of each of the divided areas has a linear shape, the drawing line that is folded back at an end portion of the contour is set. The CPU 2 determines the number of the line segment groups that are arranged parallel to each other on the inward side of the contour and in line with the contour, in accordance with the thickness of the contour represented by the drawing line. The CPU 2 provides a space of a predetermined amount L3 between adjacent line segment groups that are arranged in parallel with each other along the contour. The predetermined amount L3 of the present embodiment is the same as the first predetermined amount L1 set at step S32. The predetermined amount L3 may be different from the first predetermined amount L1 set at step S32 and may be, for example, a second predetermined amount L2 to be described later.

In the specific example, the number of the line segment groups that are arranged parallel to each other along the contour is set to 2. As shown by a state 213, drawing lines 186 and 187 are set for each of the divided areas for the contour 82 of the pattern 62. Drawing lines 188 and 189 are set for each of the divided areas for the contour 83 of the pattern 63. The CPU 2 sets a start point P1 at a base end portion of an arrow A13 and sets an end point P2 at the leading end of an arrow A14. The line segment group shown by the arrow A14 is set on the contour 82 of the pattern 62. The line segment group shown by the arrow A13 is set to be on the inward side of the contour by the predetermined amount L3 from the contour 82. The front end side of the contour 82 is represented by the drawing line 186 that is a double line and includes two line segment groups, i.e., the line segment group shown by the arrow A13 and the line segment group shown by the arrow A14. The start point P1 of the drawing line 186 is set on the inside of the line segment group shown by the arrow A14 on the contour 82. In a similar manner, a start point P3 and an end point P4 are set for the drawing line 187, a start point P5 and an end point P6 are set for the drawing line 188, and a start point P7 and an end point P8 are set for the drawing line 189. The CPU 2 may represent the contour using a plurality of lines that extend along the contour and that are separated from each other. For example, when the contour 82 is contained within one divided area, the drawing line may be two circular lines that represent the contour 82. In this case, the drawing order of the line, of the two lines, that is arranged on the inward side of the contour is set to precede the drawing order of the line arranged on the outward side of the contour.

The CPU 2 sets, as the offset area, an area that is offset by the first predetermined amount L1 set by the processing at step S32 to the inward side of the contour, from the contour identified by the processing at step S33 (step S36). In the present embodiment, the first predetermined amount L1 is a value smaller than the second predetermined amount L2 to be described later. More specifically, the first predetermined amount L1 is a value that is half the second predetermined amount L2. In the present embodiment, the first predetermined amount L1 and the predetermined amount L3 are the same value. In the case of the first condition, the CPU 2 sets, as the offset area, the area that is offset by the first predetermined amount L1 from the contour identified at step S33. In the specific example, as shown by a state 204, offset areas 90 and 81 are set for the contours 82 and 83, respectively. In the case of the second condition, the CPU 2 sets, as the offset area, an area that is offset by the first predetermined amount L1 from a section of the drawing line on the inward side of the contour. As shown by a state 214, offset areas 190 and 191 are set for the contours 82 and 83, respectively. The offset area 190 is set to an area that is offset by the first predetermined amount L1 to the inward side of the contour, not from the contour 82 but from the line segment group shown by the arrow A13 included in the drawing line 186.

The CPU 2 sets a fill line inside the offset area set at step S36 (step S37). The fill line is a line to fill, using the pen 45, the offset area offset by the first predetermined amount L1 to the inward side from the contour. The CPU 2 sets the fill line for each of the divided areas. At step S37, the CPU 2 sets a drawing position and a writing order (a start point and an end point) of the fill line. The fill line of the present embodiment is a line including a plurality of line segments that are parallel to each other at an interval of the second predetermined amount L2 that is different from the first predetermined amount L1. The interval between the plurality of line segments may be an interval in a direction perpendicular to the plurality of line segments, or may be an interval in a predetermined direction, such as the first direction, the second direction or the like. As described above, the second predetermined amount L2 is larger than the first predetermined amount L1, and in the present embodiment, it is a value twice the first predetermined amount L1. For example, the fill line is a line including a plurality of line segments that extend in the first direction or the second direction and that are parallel to each other. In the specific example, as shown by a state 205, meandering fill lines 70 and 93, which connect a plurality of line segments that extend in the first direction at the interval of the second predetermined amount L2 and that are parallel to each other, are set for each of the divided areas of the pattern 62. Meandering fill lines 94 and 95, which connect a plurality of line segments that extend in the first direction at the interval of the second predetermined amount L2 and that are parallel to each other, are set for each of the divided areas of the pattern 63. Note that the second predetermined amount L2 may be the same as the first predetermined amount L1.

The fill line may be, for example, a line that includes a plurality of line segments that are parallel to each other and that are included at a predetermined angle with respect to the first direction. The predetermined angle is preferably an angle that is not the same as an angle of a side of the pattern. The predetermined angle may be set in advance, may be specified by the user, or may be set automatically in accordance with the shape and the like of the pattern. More specifically, a plurality of line segments that have a predetermined length or more and that are included in the drawing line of the pattern identified at step S33 may be identified, and an angle that is inclined with respect to each of the plurality of line segments included in the pattern may be set as the predetermined angle. By doing this, even when the pattern is a graphic, such as a diamond-shaped graphic, that has a side of the predetermined length or more, the plotter 1 can inhibit an uneven fill from being noticeable. The predetermined angle of the present embodiment is 5 degrees in the clockwise direction with respect to the first direction. In a specific example in this case, as shown by a state 215, meandering lines 192 and 193 are respectively set for the divided areas of the pattern 62. The lines 192 and 193 are obtained by connecting a plurality of line segments that are parallel to each other and that are inclined at the predetermined angle in the clockwise direction from the first direction at the interval of the second predetermined amount L2. Meandering lines 194 and 195 are respectively set for the divided areas of the pattern 63. The lines 194 and 195 are obtained by connecting a plurality of line segments that are parallel to each other and that are inclined at the predetermined angle in the clockwise direction from the first direction at the interval of the second predetermined amount L2.

The CPU 2 sets the drawing order of the drawing line and the fill line that are set for each of the divided areas (step S38). The CPU 2 sets the drawing order of the drawing line to precede the drawing order of the fill line. The CPU 2 of the present embodiment sets the drawing order of each of the plurality of divided areas sequentially from a downstream side in the first direction, and sets the drawing line and the fill line for each of the plurality of divided areas. The downstream side of the present embodiment is a side from the roller 40 toward the mounting portion 32 in the first direction, and is the front side. In the specific example, in the case of the first condition, the CPU 2 sequentially sets the drawing line 86, the fill line 70, the drawing line 87, the fill line 93, the drawing line 88, the fill line 94, the drawing line 89 and the fill line 95, in ascending order of the drawing order. In the case of the second condition, as shown in FIG. 7, the CPU 2 sequentially sets the drawing line 186, the fill line 192, the drawing line 187, the fill line 193, the drawing line 188, the fill line 194, the drawing line 189 and the fill line 195, in ascending order of the drawing order.

The CPU 2 generates the plot data (first data) instructing drawing positions of the drawing lines and the fill lines on the workpiece 20 (step S39). The CPU 2 of the present embodiment sets the drawing line and the fill line for each of the plurality of generated divided areas, and generates the plot data instructing the drawing positions of the drawing lines and the fill lines on the workpiece 20 in accordance with the drawing order set at step S38. As exemplified in FIG. 5, in the case of the first condition, the CPU 2 generates plot data D1 in FIG. 5. The plot data D1 includes drawing line data, fill line data and an end code D4. Each of the drawing line data and the fill line data includes coordinate data, a start code and a stop code. The coordinate data includes instructions to drive the Y movement mechanism 7 and the X movement mechanism 8 and to relatively move the workpiece 20 and the mounting portion 32 to positions indicated by the coordinate data. The coordinate data is represented by the coordinates of the XY coordinate system, and indicates positions, on the workpiece 20, of end points of a plurality of continuous line segments included in the drawing line or the fill line. For example, in drawing line data D2 for the drawing line 86, the coordinates of the end points of a plurality of continuous line segments, such as the start point P31 shown in the state 203 in FIG. 6, an end point P32 of the line segment LS1 extending from the start point P31, and an end point P33 of the line segment LS2 extending from the end point P32, are indicated by the coordinate data. In the drawing line data D2, the start point P31 of the drawing line 86 is set to be on the inward side of the contour, relative to the contour 82 identified at step S33. In fill line data D3 for the fill line 70, the coordinates of the end points of a plurality of continuous line segments, such as a start point P41 shown in the state 205 in FIG. 6, an end point P42 of a line segment LS3 extending from the start point P41 in the first direction, and an end point P43 of a line segment LS4 extending from the end point P42 in the second direction, are indicated by the coordinate data. The start code includes instructions to drive the Z movement mechanism 33 and cause the mounting portion 32 to move from the raised position to the lowered position. The stop code includes instructions to drive the Z movement mechanism 33 and cause the mounting portion 32 to move from the lowered position to the raised position. The end code D4 includes instructions to end drawing processing. In the case of the second condition also, the CPU 2 generates the plot data in the same manner. The CPU 2 ends the data generation processing and returns the processing to the drawing control processing in FIG. 4.

The CPU 2 acquires information relating to the remaining amount of the liquid adhesive 44 of the pen 45 mounted on the mounting portion 32 via the cartridge 4 (step S17). The CPU 2 acquires the information relating to the remaining amount that has been input via the touch panel 53. It is sufficient that the information relating to the remaining amount of the liquid adhesive 44 is information representing the remaining amount of the liquid adhesive 44, and in the present embodiment, it is the numeric value of the scale 49 of the pen 45. The user visually checks the remaining amount of the liquid adhesive 44 from the window portion 48 of the pen 45, and inputs the numeric value of the scale 49 corresponding to the remaining amount of the liquid adhesive 44 to the plotter 1 through a panel operation. The CPU 2 acquires the numeric value input by the user as the information relating to the remaining amount. The CPU 2 of the present embodiment acquires one of the numeric values from 1 to 4 that has been input, as the information relating to the remaining amount of the liquid adhesive 44. In the specific example, 1 is acquired as the information relating to the remaining amount of the liquid adhesive 44. The information relating to the remaining amount of the liquid adhesive 44 may be, for example, a weight of the pen 45 or may be a signal of a sensor (a distance sensor, for example) that detects the remaining amount of the liquid adhesive 44. The information relating to the remaining amount of the liquid adhesive 44 may be information that the not yet used pen 45 has been mounted and information obtained by subtracting a value corresponding to the distance of the line drawn from when the not yet used pen 45 is mounted.

On the basis of the information relating to the remaining amount of the liquid adhesive 44 acquired at step S17, the CPU 2 sets the relative movement speed of the mounting portion 32 and the workpiece 20 by the Y movement mechanism 7 and the X movement mechanism 8 (step S18). The CPU 2 sets the movement speed when the remaining amount of the liquid indicated by the acquired information relating to the remaining amount is smaller than when the remaining amount is larger. The CPU 2 of the present embodiment refers to the flash memory 74 and sets the movement speed corresponding to the information representing the remaining amount acquired by the processing at step S17. The movement speed may be set for each of the Y movement mechanism 7 and the X movement mechanism 8, or may be set for a combined speed by the Y movement mechanism 7 and the X movement mechanism 8. In the specific example, the CPU 2 sets the movement speed of the mounting portion 32 by the X movement mechanism 8 and the Y movement mechanism 7 to a speed V1, on the basis of the numeric value 1 of the scale 49 that is the information relating to the remaining amount of the liquid adhesive 44 acquired at step S17 and the correspondence stored in the speed data storage area 741 (step S18). The CPU 2 sets a threshold value on the basis of the information relating to the remaining amount of the liquid adhesive 44 acquired at step S17 and the correspondence stored in the speed data storage area 741 (step S19). The threshold value is used in processing to change the relative movement speed of the mounting portion 32 and the workpiece 20 in accordance with the distance of the line drawn using the liquid. The distance of the line drawn using the liquid is identified on the basis of the length of the line drawn by the pen 45, the weight of the pen 45, a time period during which the drawing processing is performed by the pen 45, or the like. In the specific example, a threshold value Q1 is set corresponding to the numeric value 1 of the scale 49.

The CPU 2 determines whether or not a drawing start command has been acquired (step S20). The drawing start command is a command to start the drawing processing and is input by the user through a panel operation. The drawing processing is processing to draw the pattern on the workpiece 20 using the pen 45 mounted on the mounting portion 32 via the cartridge 4. When the drawing start command has not been acquired (no at step S20), the CPU 2 stands by until the drawing start command is input.

When the drawing start command has been acquired (yes at step S20), the CPU 2 starts the drawing processing to draw the pattern identified at step S14 on the workpiece 20 using the pen 45 (step S21). On the basis of the plot data generated at step S39, the CPU 2 controls the Y movement mechanism 7, the X movement mechanism 8, and the Z movement mechanism 33, and relatively moves the mounting portion 32 and the workpiece 20, thus drawing the drawing lines and the fill lines on the workpiece 20 using the pen 45 mounted on the mounting portion 32. On the basis of the plot data generated by the processing at step S39 and the movement speed set by the processing at step S18, the CPU 2 controls the Y movement mechanism 7, the X movement mechanism 8, and the Z movement mechanism 33, and relatively moves the mounting portion 32 with respect to the workpiece 20 at the movement speed set by the processing at step 518, thus drawing the pattern on the workpiece 20.

Specifically, on the basis of the plot data generated at step S39 in FIG. 5, the CPU 2 drives the Y movement mechanism 7 and the X movement mechanism 8 and moves the workpiece 20 to a position at which a start position of the contour of the divided area to be arranged on the forefront side is on the lower side of the lower end of the pen 45. The CPU 2 drives the Z movement mechanism 33 and moves the mounting portion 32 to the lowered position at which the mounting portion 32 is in close proximity to the workpiece 20, and causes the pen tip portion 47 of the pen 45 mounted on the mounting portion 32 to come into contact with the workpiece 20. In accordance with the plot data generated at step S39, the CPU 2 drives the X movement mechanism 8 and the Y movement mechanism 7 and moves the mounting portion 32 with respect to the workpiece 20 at the movement speed set at step S18. The movement speed of the mounting portion 32 reaches the movement speed set at step S18 through acceleration after the start of the movement. When the line segment to be drawn by the pen 45 is relatively short, the movement speed is reduced to draw the next line segment without reaching the speed V1. For that reason, the relative movement speed of the mounting portion 32 and the workpiece 20 is not constantly the speed V1. The drawing is performed using the pen 45 at positions on the drawing line and the fill line of the workpiece 20. The CPU 2 adds movement distances of the mounting portion 32 with respect to the workpiece 20, and identifies the distance of the line drawn on the workpiece 20 (step S22). An initial value of the movement distance is 0. Every time the processing at step S22 is performed, the CPU 2 adds the distance of the line segments already drawn to the movement distance.

The CPU 2 determines whether or not the distance acquired at step S22 is larger than the threshold value set by the processing at step S19 or step S26 (step S23). When the distance is not larger than the threshold value (no at step S23), the CPU 2 determines whether or not to end the drawing processing that is based on the plot data (step S27). When the end code included in the plot data is read out, the CPU 2 determines that the drawing processing is to be ended. When the drawing processing is not to be ended (no at step S27), the CPU 2 returns the processing to step S22. When the distance is larger than the threshold value at step S23 (yes at step S23), the CPU 2 determines whether or not the relative position of the workpiece 20 and the mounting portion 32 is at the start point of any one of the line segments (step S24). As described above, the plot data of the present embodiment includes the coordinate data that is used to draw a plurality of continuous line segments. When the distance identified at step S22 reaches the threshold value, the CPU 2 of the present embodiment relatively moves the mounting portion 32 with respect to the workpiece 20 at the movement speed reset from the start point of the next line segment in the drawing order among the plurality of line segments.

When the relative position of the workpiece 20 and the mounting portion 32 is not at the start point of the line segment (no at step S24), the CPU 2 returns the processing to step S22. When the relative position of the workpiece 20 and the mounting portion 32 is at the start point of the line segment (yes at step S24), the CPU 2 changes the movement speed of the mounting portion 32 with respect to the workpiece 20 set at step S18 or at step S25 previously performed (step S25). The processing at step S25 is processing to reset the movement speed in accordance with the distance of the line drawn from when the drawing is started to when the drawing is ended in accordance with the plot data. When the distance identified at step S22 exceeds the threshold value, the CPU 2 resets the movement speed to a speed slower than the current set movement speed. When the movement speed is reset, the CPU 2 drives each of the Y movement mechanism 7 and the X movement mechanism 8 at the reset movement speed, and relatively moves the workpiece 20 and the mounting portion 32, thus drawing the pattern on the workpiece 20. Specifically, the CPU 2 moves the mounting portion 32 with respect to the workpiece 20 at the movement speed changed at step S25. In a specific example, when the distance reaches the threshold value Q1, the CPU 2 sets the movement speed to a speed V2, which is the next fastest speed after the speed V1, and thus changes the relative movement speed of the workpiece 20 and the mounting portion 32 in the first direction and in the second direction to the speed V2. The CPU 2 changes the threshold value set at step S19 or the previously performed step S26 from Q1 to Q2. The CPU 2 sets the distance, which is added at step S22, to 0 and thus resets the distance (step S26). The CPU 2 returns the processing to step S22.

When the CPU 2 reads out the end code (yes at step S27), the CPU 2 ends the drawing processing (step S28). Specifically, the CPU 2 drives the Z movement mechanism 33 on the basis of the stop code, and moves the mounting portion 32 in a direction (the upward direction) in which the mounting portion 32 is separated from the workpiece 20. In this state, the CPU 2 drives the X movement mechanism 8 and moves the mounting portion 32 to an initial position.

The CPU 2 drives the Y movement mechanism 7 and discharges the workpiece 20 forward. The CPU 2 ends the drawing control processing.

After the end of the drawing control processing by the plotter 1, the user performs the above-described arrangement process (S3). After the drawing area, in which the drawing has been performed on the workpiece 20, becomes transparent and colorless, the user arranges the foil sheet 65 and the protective sheet on the workpiece 20 in order, so as to cover the drawing area on the workpiece 20. The user arranges the workpiece 20, on which the foil sheet 65 has been arranged, on the platen 3 of the plotter 1, removes the pen 45 mounted on the mounting portion 32, and mounts the pressing member 35. After that, the user performs a panel operation and inputs a start command to activate the pressing control processing. In the pressing control processing, after the drawing processing has been performed, the CPU 2 controls the Y movement mechanism 7, the X movement mechanism 8 and the Z movement mechanism 33, and performs pressing processing in which the pressing member 35 mounted on the mounting portion 32 presses a pressing area including the drawing area from above the foil sheet 65 arranged on the workpiece 20. When the CPU 2 receives the start command, the CPU 2 performs the pressing control processing shown in FIG. 8 on the basis of the program stored in the ROM 72.

Figure 8:
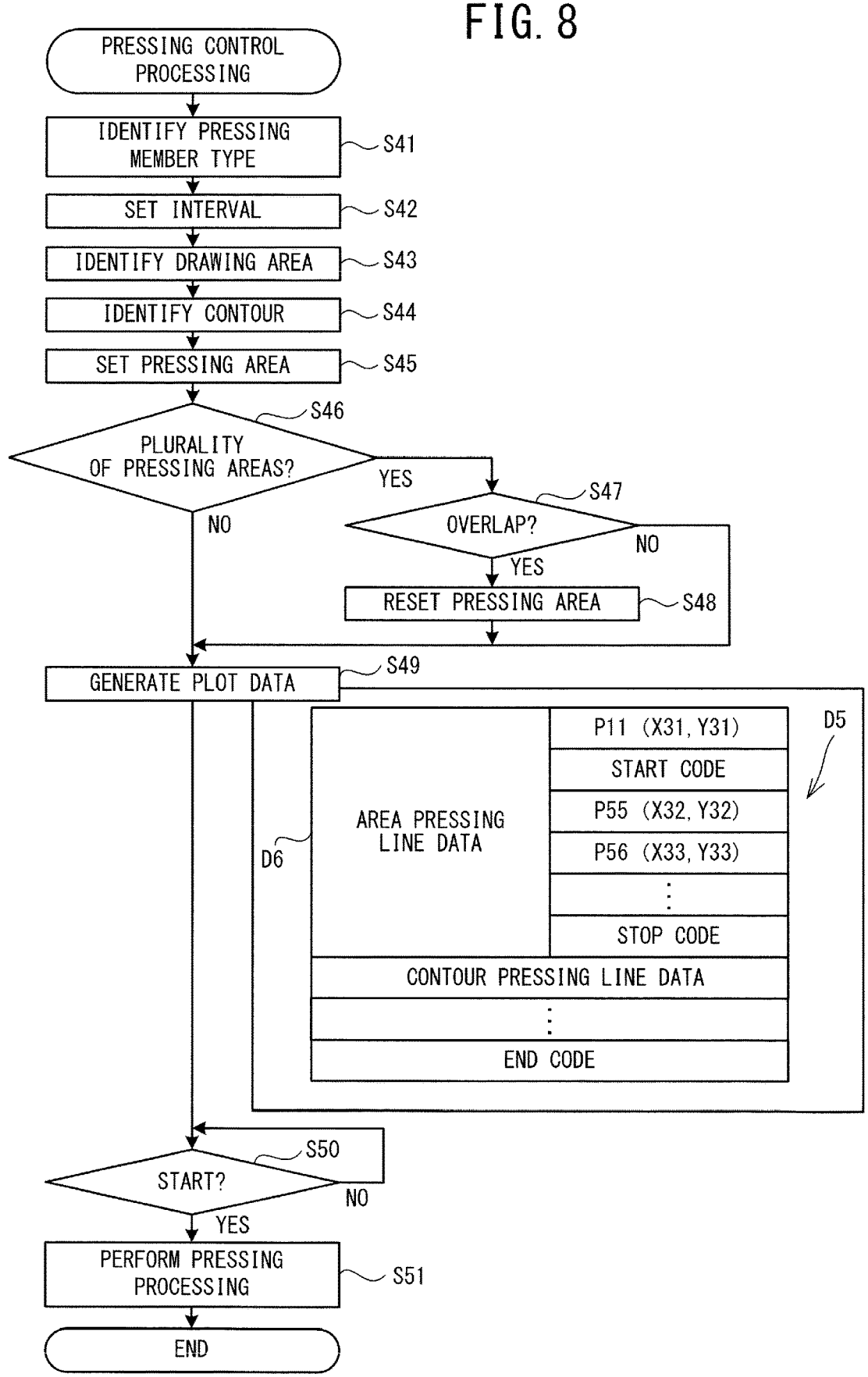
FIG. 8 is a flowchart of pressing control processing.
Figure 9:
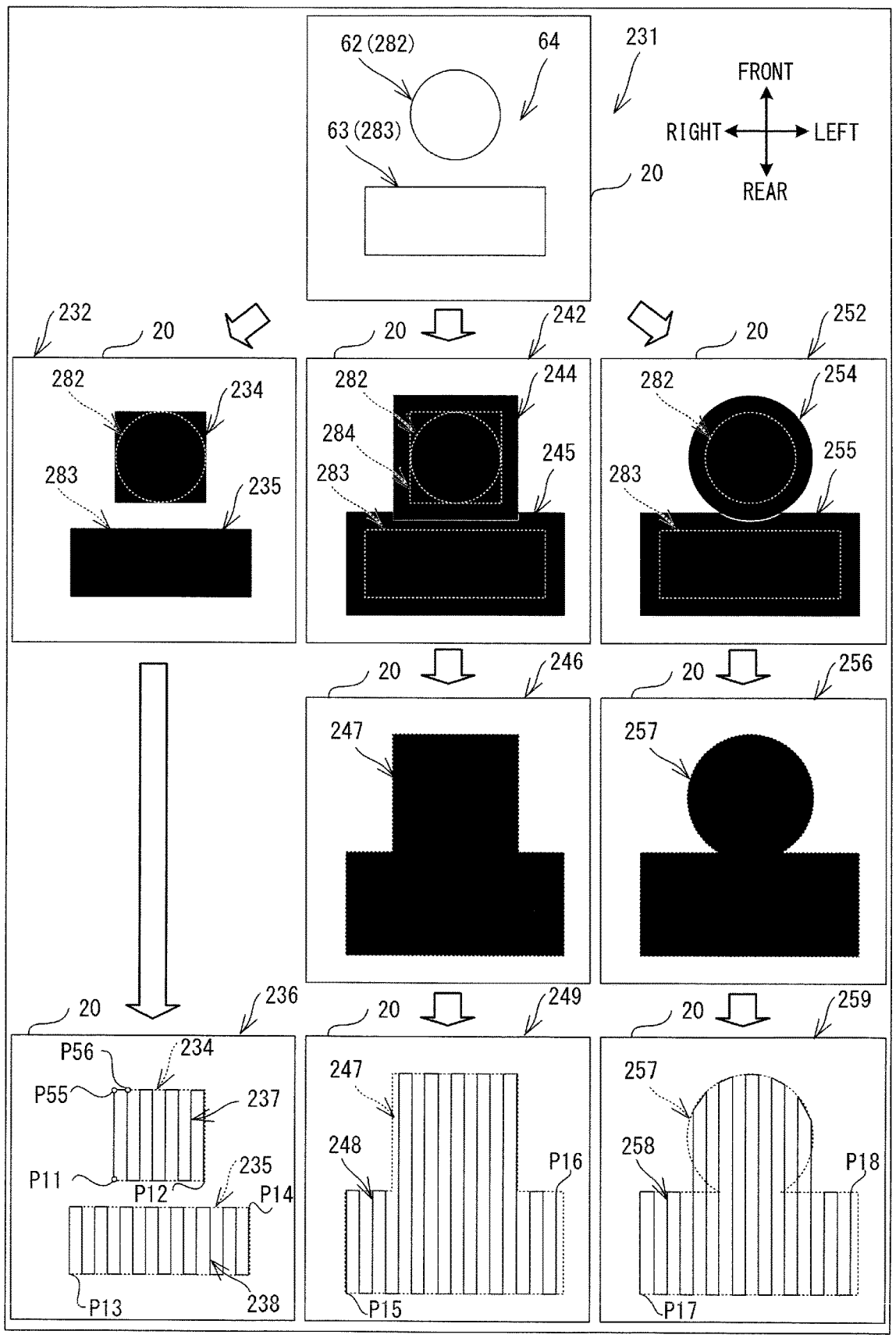
FIG. 9 is an explanatory diagram of a process to generate plot data instructing pressing positions to press a pressing area including a drawing area of the pattern of the specific example.

As shown in FIG. 8, in the pressing control processing, the CPU 2 identifies the type of the pressing member 35 that is mounted on the mounting portion 32 (step S41). The processing at step S41 may be performed as appropriate by the same processing as the processing at step S31. The CPU 2 of the present embodiment identifies the type of the pressing member 35 on the basis of the numeric value specified by the user. The CPU 2 sets an interval of a plurality of line segments included in a pressing line, on the basis of the type of the pressing member 35 identified by the processing at step S41 and the correspondence relationship between the type and the interval stored in the pressing member type storage area 743 (step S42). When the numeric value representing the type of the pressing member 35 is 1, the CPU 2 sets the interval to U1.

The CPU 2 identifies the drawing area on the workpiece 20 on which the pattern has been drawn using the liquid adhesive 44 (step S43). The CPU 2 of the present embodiment identifies the drawing area on the basis of the arrangement of the pattern identified at step S14 and set at step S15. When the drawing area can be visually checked, the CPU 2 may identify the drawing area on the basis of the image data generated by scanning the workpiece 20. The CPU 2 may identify the drawing area on the basis of data acquired from an external device, such as the USB memory 60. The CPU 2 identifies the contour of the drawing area identified at step S43 (step S44). The CPU 2 identifies the contour of the drawing area on the basis of the arrangement of the pattern set at step S15. In a specific example, as shown by a state 231 in FIG. 9, a contour 282 is identified for the pattern 62 of the pattern 64, and a contour 283 is identified for the pattern 63. The CPU 2 may identify, as the contour of the drawing area, a line that is offset to the outward side of the contour by the thickness of the line drawn by the pen 45 from the area indicated by the plot data generated at step S39. In this case, the offset amount in the processing at step S43 may be set to the first predetermined amount L1, for example. The CPU 2 may identify, as the contour of the drawing area, the contour of the pattern indicated by the plot data generated at step S39 and used in the drawing control processing.

The CPU 2 sets the pressing area including the drawing area on the basis of the contour identified at step S44 (step S45). The pressing area is an area over which the pressing member 35 mounted on the mounting portion 32 presses the workpiece 20, on which the foil sheet 65 has been arranged, from above the foil sheet 65. A setting method of the pressing area may be determined as appropriate while taking account of the configuration of the Y movement mechanism 7 and the X movement mechanism 8, the shape of the pressing member 35, and the like. For example, the CPU 2 may set a rectangular area that encompasses the drawing area as the pressing area. The rectangular area that encompasses the drawing area may be the smallest rectangle that encompasses the drawing area. The CPU 2 sets the extending direction of two sides of the four sides of the contour of the rectangular area as the first direction, and sets the extending direction of the remaining two sides as the second direction. In this case (hereinafter referred to as a case of a third condition), as shown by a state 232 in the specific example, a pressing area 234 that encompasses the contour 282 and a pressing area 235 that is surrounded by the contour 283 are set. The CPU 2 may set, as the pressing area, a rectangular area obtained by offsetting the smallest rectangle encompassing the pressing area by a predetermined amount toward the outside of the smallest rectangle. In this case (hereinafter referred to as a case of a fourth condition), as shown by a state 242 in the specific example, a pressing area 244 obtained by offsetting the rectangular area 284 encompassing the contour 282 by the predetermined amount toward the outside of the rectangular area 284, and a pressing area 245 obtained by offsetting the contour 283 by the predetermined amount to the outward side of the contour are set. The CPU 2 may set, as the pressing area, an offset area obtained by offsetting the drawing area by the predetermined amount toward the outside of the drawing area. In this case (hereinafter referred to as a case of a fifth condition), as shown by a state 252 in the specific example, a pressing area 254 obtained by offsetting the contour 282 by the predetermined amount to the outward side of the contour, and a pressing area 255 obtained by offsetting the contour 283 by the predetermined amount to the outward side of the contour are set as the pressing areas. The offset amount in the case of the fourth condition and in the case of the fifth condition may be set in advance or may be settable by the user. Alternatively, the offset amount may be automatically set in accordance with the type of the pressing member 35, the shape of the pattern, and the like. The offset amount in the present embodiment is set to a value that is larger than the interval set at step S42, and specifically, is set to a value that is 1.5 times the interval set at step S42.

The CPU 2 determines whether or not a plurality of the pressing areas are set at step S45 (step S46). In all of the state 232, the state 242 and the state 252, a plurality of the pressing areas are set (yes at step S46). In this case, the CPU 2 determines whether or not the pressing areas having an overlapping section are present in the plurality of pressing areas (step S47). When a plurality of the drawing areas are identified by the processing at step S46 and step S47, the CPU 2 determines whether or not an overlapping section is present in the pressing areas respectively set for the plurality of drawing areas. In the state 242 and the state 252, there are the pressing areas having the overlapping section (yes at step S47). In this case, the CPU 2 integrates the pressing areas having the overlapping section into a single pressing area and resets the pressing area (step S48). As exemplified by a state 246, the pressing area 244 and the pressing area 245 are integrated into a single pressing area 247. As exemplified by a state 256, the pressing area 254 and the pressing area 255 are integrated into a single pressing area 257.

When a plurality of the pressing areas are not set (no at step S46), or when there are no pressing areas having an overlapping section as shown by the state 232 (no at step S47), or after the processing at step S48, the CPU 2 generates the plot data (second data) instructing the pressing of the pressing area including the drawing area identified at step S43, using the pressing member 35 mounted on the mounting portion 32 (step S49). The plot data instructing the pressing of the pressing area may be set as appropriate in accordance with the type of the pressing member 35, the size of the pressing area, and the like. The CPU 2 of the present embodiment generates the plot data to press the pressing area by moving the pressing member 35 along the pressing line including the plurality of line segments that are parallel to each other and that are arranged at the interval in accordance with the type of the pressing member 35 identified by the processing at step S42. With respect to the plurality of pressing areas that are determined to have an overlapping section at step S47, the CPU 2 generates the plot data taking the plurality of pressing areas having the overlapping section as a single pressing area. With respect to the pressing areas that are determined to have no overlapping section, the CPU 2 generates the plot data for each of the one or more pressing areas.

After pressing the pressing area, the CPU 2 of the present embodiment generates the plot data instructing pressing of the contour of the drawing area. The CPU 2 of the present embodiment generates the plot data instructing the pressing member 35 mounted on the mounting portion 32 to be moved with respect to the workpiece 20 in the second direction that intersects the first direction, while reciprocating the pressing member 35 mounted on the mounting portion 32 in the first direction with respect to the workpiece 20, and to press the pressing area in order from one end toward the other end in the second direction of the pressing area. When there are a plurality of the pressing areas, the one end to the other end in the second direction of the pressing area may be different for each of the pressing areas or may be the same for each of the pressing areas.

The CPU 2 generates the plot data (the second data) according to the following procedure, for example. In the pressing area, the CPU 2 arranges a plurality of line segments extending in parallel to the first direction at the interval set at step S42. For each of the pressing areas, the CPU 2 sets a plurality of line segments that extend in the first direction at the interval set at step S42. For example, when the type of the pressing member 35 is 1, the CPU 2 sets a plurality of line segments that extend in the first direction at the interval U1. For each of the plurality of set line segments, the CPU 2 sets, as end points of the line segment extending in the first direction, an intersection point that is closest to one end in the first direction and an intersection point that is closest to the other end, among intersection points of the pressing area and the contour. End portions of adjacent line segments of the plurality of line segments are connected as appropriate, and one pressing line is set for each one of the pressing areas. In the case of the third condition in the specific example, as shown by a state 236, a pressing line 237 that includes a start point P11 and an end point P12 is set for the pressing area 234. A pressing line 238 that includes a start point P13 and an end point P14 is set for the pressing area 235.

In the case of the fourth condition, as shown by a state 249, a pressing line 248 that includes a start point P15 and an end point P16 is set for the pressing area 247. In the case of the fifth condition, as shown by a state 259, a pressing line 258 that includes a start point P17 and an end point P18 is set for the pressing area 257. The CPU 2 generates the plot data to press the workpiece 20 from above the foil sheet 65 using the pressing member 35 along the set pressing line from the start point to the end point. In the case of the third condition, as exemplified in FIG. 8, plot data D5, which is generated at step S49, is generated. The plot data D5 includes area pressing line data, contour pressing line data and the end code. The area pressing line data is data that indicates the position of the pressing line set in the pressing area. The contour pressing line data is data that indicates the position of the pressing line to press the contour. As shown by area pressing line data D6, the area pressing line data includes the coordinate data, the start code and the end code in the same manner as the drawing line data and the fill line data. For example, in the area pressing line data D6 for the pressing line 237, the coordinates of end points of a plurality of continuous line segments, such as the start point P11 shown in the state 236 in FIG. 9, an end point P55 of a line segment extending from the start point P11, and an end point P56 of a line segment extending from the end point P55, are indicated by the coordinate data. A setting method of the pressing line may be changed as appropriate.

The CPU 2 determines whether or not a command to start the pressing processing has been input (step S50). The command to start the pressing processing is input by a panel operation. When the command has not been input (no at step S50), the CPU 2 stands by until the command is input. When the command has been input (yes at step S50), the CPU 2 performs the pressing processing on the basis of the plot data generated by the processing at step S49 (step S51). In accordance with the plot data, the CPU 2 moves the pressing member 35 mounted on the mounting portion 32 with respect to the workpiece 20 in the second direction that intersects the first direction, while reciprocating the pressing member 35 mounted on the mounting portion 32 with respect to the workpiece 20 in the first direction, and presses the pressing area in order from the one end toward the other end in the second direction of the pressing area. The CPU 2 of the present embodiment relatively moves the pressing member 35 and the workpiece 20 in accordance with the area pressing line data included in the plot data, and causes the pressing member 35 to press the pressing area. After that, the CPU 2 causes the pressing member 35 to press the contour of the drawing area in accordance with the contour pressing line data included in the plot data. After the end of the pressing processing, the CPU 2 ends the pressing control processing.

Figure 10:
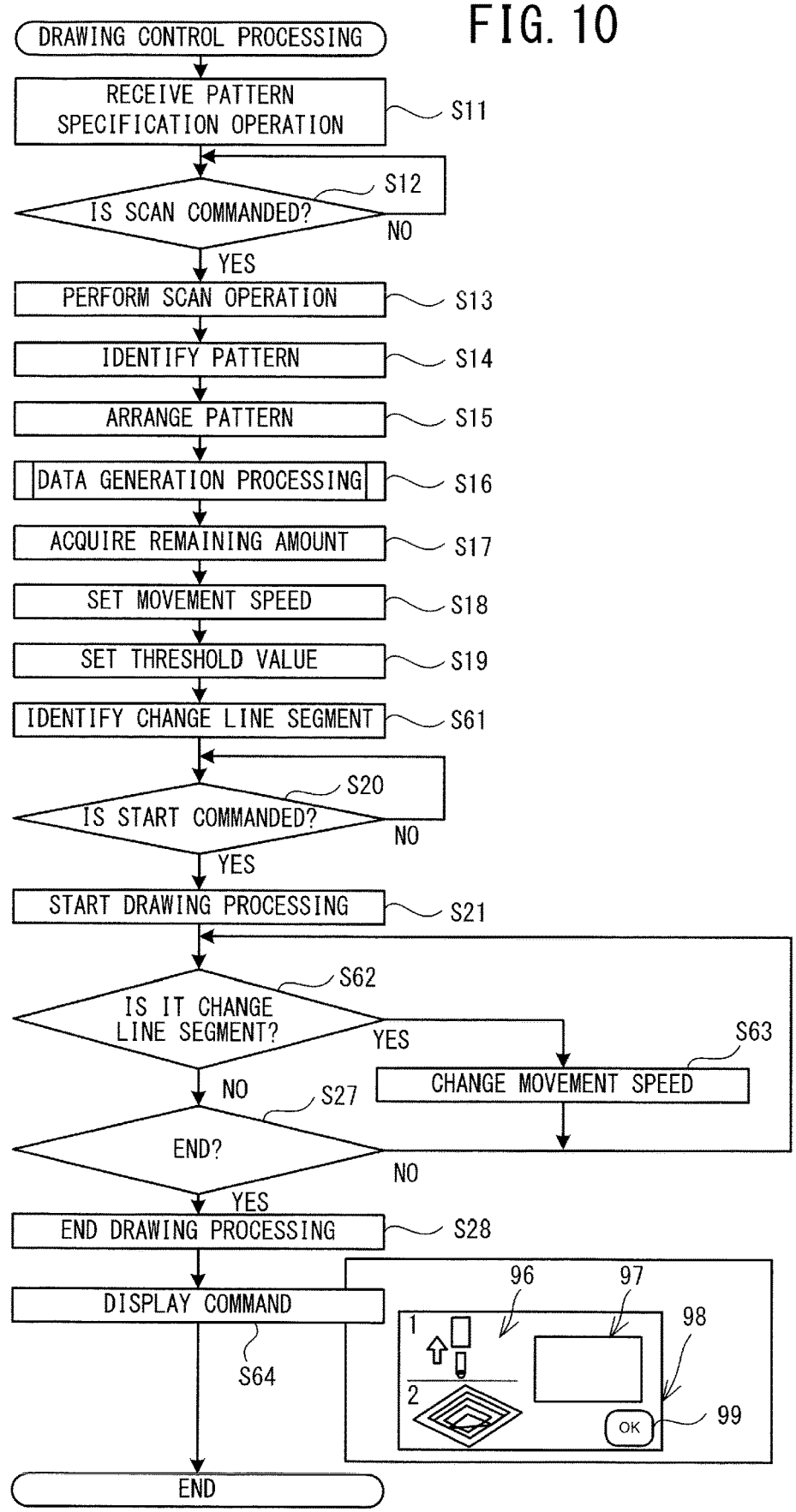
FIG. 10 is an explanatory diagram of drawing control processing of a second embodiment.

Drawing control processing of the second embodiment will be explained with reference to FIG. 10. In the drawing control processing of the second embodiment shown in FIG. 10, processing that is the same as the drawing control processing in FIG. 4 is denoted by the same reference numeral and an explanation thereof will be simplified or omitted. As shown in FIG. 10, the drawing control processing of the second embodiment is different from the drawing control processing of the first embodiment in that processing at step S61 is performed between step S19 and step S20, processing at step S62 and step S63 is performed in place of the processing from step S22 to step S26, and processing at step S64 is performed after processing at step S28. At step S61, the CPU 2 identifies a change line segment. The change line segment is, among the plurality of line segments included in the drawing line and the fill line, a line segment for which the relative movement speed of the workpiece 20 and the mounting portion 32 is to be changed during the drawing processing. The CPU 2 sequentially reads out the data included in the plot data generated at step S39 and identifies, as the change line segment, a line segment for which the distance of the line segment to be drawn using the liquid adhesive 44 reaches the threshold value. More specifically, for example, on the basis of the coordinates of the end points of the line segments indicated by the plot data, the CPU 2 calculates the distance by adding lengths of the line segments to be drawn in ascending order of the drawing order, in the same manner as in the processing at step S22, and identifies the line segment at which the distance reaches the threshold value set in the processing at step S19. When the change line segment is identified, the CPU 2 changes the threshold value by processing that is the same as the processing at step S26, and resets the distance. The CPU 2 repeats the above-described processing until the end code of the plot data is acquired.

In the processing at step S62, it is determined whether or not the line segment to be drawn is the change line segment set at step S61 (step S62). When the line segment is not the change line segment (no at step S62), the CPU 2 performs the processing at step S27. When the line segment is the change line segment (yes at step S62), the CPU 2 changes the relative movement speed of the workpiece 20 and the mounting portion 32 to a value that corresponds to the remaining amount of the liquid adhesive 44 contained in the pen 45 (step S63). For example, when the current speed is the speed V1 in FIG. 2, the CPU 2 sets the speed V2, which is the next fastest speed after the speed V1 in the processing at step S63. After the processing at step S63, the CPU 2 performs the processing at step S62. At step S27, when the end code is not read out (no at step S27), the CPU 2 returns the processing to step S62. At step S64, the CPU 2 causes the LCD 51 to display a command that prompts the user to change the pen 45 mounted on the mounting portion 32 to the pressing member 35 (step S64). For example, the CPU 2 causes a screen 98 in FIG. 10 to be displayed on the LCD 51. The screen 98 includes an illustration 96, a message 97 and an OK key 99. The illustration 96 and the message 97 prompt the user to change the pen 45 mounted on the mounting portion 32 to the pressing member 35, and to arrange the foil sheet 65 and the protective sheet on the workpiece 20. The OK key 99 is a key to command the start of the pressing control processing. When the OK key 99 is selected, the CPU 2 activates the pressing control processing that is the same as that in the first embodiment.

The plotter 1 of the above-described embodiments can set the relative movement speed of the mounting portion 32 with respect to the workpiece 20 while taking account of the remaining amount of the liquid (the liquid adhesive 44 in the present embodiment) contained in the pen 45 mounted on the mounting portion 32. Therefore, the plotter 1 can reduce the possibility that the thickness of the line drawn on the workpiece 20 becomes uneven depending on the remaining amount of the liquid contained in the pen 45.

The CPU 2 sets the relative movement speed of the workpiece 20 and the mounting portion 32 the movement speed slower when the remaining amount of the liquid indicated by the information relating to the remaining amount acquired at step S17 is smaller than when the remaining amount is larger. When the plotter 1 relatively moves the workpiece 20 and the mounting portion 32 at the same movement speed and performs drawing on the workpiece 20 by the pen 45 mounted on the mounting portion 32 using the liquid, the smaller the remaining amount of the liquid contained in the pen 45, the thinner the line tends to be, in comparison to when the remaining amount is larger.

Since the plotter 1 appropriately sets the movement speed of the mounting portion 32 with respect to the workpiece 20 in correspondence with the remaining amount of the liquid contained in the pen 45, the plotter 1 can reduce the possibility that the thickness of the line drawn by the pen 45 becomes uneven.

The plotter 1 has the touch panel 53 that receives, from the user, an input of the information relating to the remaining amount of the liquid of the pen 45. The CPU 2 acquires the information relating to the remaining amount input via the touch panel 53 in the processing at step S17. Therefore, the plotter 1 can easily acquire the information relating to the remaining amount of the liquid contained in the pen 45.

The plotter 1 is provided with the flash memory 74 that stores the correspondence between the numeric value representing the remaining amount of the liquid contained in the pen 45 and the movement speed. In the processing at step S17, the CPU 2 acquires the numeric value representing the remaining amount as the information relating to the remaining amount. In the processing at step S18, the CPU 2 refers to the flash memory 74 and sets the movement speed corresponding to the numeric value representing the remaining amount acquired at step S17. Therefore, the plotter 1 can appropriately set the movement speed of the mounting portion 32 corresponding to the remaining amount of the liquid, on the basis of the correspondence between the numeric value representing the remaining amount of the liquid and the movement speed stored in the flash memory 74.

The CPU 2 resets the movement speed according to the distance of the line drawn from when the drawing is started to when the drawing is ended in accordance with the plot data (step S25). When the movement speed is reset, the CPU 2 relatively moves the workpiece 20 and the mounting portion 32 at the reset movement speed, and thus performs the drawing on the workpiece 20. Therefore, even when a line of a relatively long distance is drawn in accordance with the plot data, the plotter 1 can suppress the thickness of the drawn line from becoming uneven in the course of the drawing as a result of a decrease in the remaining amount of the liquid.

The CPU 2 identifies the distance of the line drawn on the workpiece 20 (step S22). When the identified distance exceeds the threshold value (yes at step S23), the CPU 2 resets the movement speed to be slower than the currently set movement speed (step S25). The plotter 1 can appropriately reset the relative movement speed of the workpiece 20 with respect to the pen 45 mounted on the mounting portion 32, in accordance with the distance of the line that is drawn on the workpiece 20.

The plot data includes the data instructing the drawing positions of the plurality of continuous line segments. When the distance identified at step S22 reaches the threshold value, the Y movement mechanism 7 and the X movement mechanism 8 relatively move the workpiece 20 and the mounting portion 32 at the movement speed reset at step S25, from the start point of the line segment that is next in the drawing order among the plurality of line segments. The plotter 1 can inhibit a situation in which the relative movement speed of the pen 45 mounted on the mounting portion 32 and the workpiece 20 is changed in the middle of the same line segment and the thickness of the drawn line changes. In comparison to when the movement speed is changed in the middle of the line segment, the plotter 1 can make a point at which the line thickness changes unnoticeable and can improve the finish of the drawing by the liquid.

The plot data includes the data instructing the drawing positions of the plurality of continuous line segments. When the drawing is performed in accordance with the plot data, before the drawing processing is started in accordance with the plot data, the CPU 2 of the second embodiment identifies, from among the plurality of line segments, the line segment at which the distance of the line to be drawn on the workpiece 20 reaches the threshold value (step S61). When the identified line segment is drawn, the CPU 2 resets the movement speed to be slower than the currently set movement speed (step S63). The plotter 1 can inhibit the situation in which the relative movement speed of the workpiece 20 with respect to the pen 45 mounted on the mounting portion 32 is changed in the middle of the same line segment and the thickness of the drawn line changes. In comparison to when the movement speed is changed in the middle of the line segment, the plotter 1 can make the point at which the line thickness changes unnoticeable and can improve the finish of the drawing by the liquid.

The larger the remaining amount of the liquid, the larger the threshold values set at step S19 and step S26, in comparison to when the remaining amount of the liquid indicated by the information relating to the remaining amount is smaller. Thus, in accordance with the information relating to the remaining amount that is acquired by the processing at step S17, the plotter 1 can appropriately reset the relative movement speed of the pen 45 mounted on the mounting portion 32 and the workpiece 20. When the movement speed is reset, the plotter 1 can improve the finish of the drawing by the liquid, in comparison to when the information relating to the remaining amount of the liquid acquired before the start of the drawing processing is not taken into consideration.

Since the pen 45 has the scale 49, by looking at the scale 49, the user can easily grasp the remaining amount of the liquid adhesive 44 contained in the pen 45 that is mounted on the plotter 1. By looking at the scale 49, the user can estimate the distance of the line that can be drawn using the liquid adhesive 44. In the pen 45 of the present embodiment, the whole of the container portion 46 is the window portion 48. Therefore, the user can easily grasp the remaining amount of the liquid adhesive 44, irrespective of the posture of the container portion 46.

The scale 49 includes the three or more lines 491 to 494, and respective distances from each of the three or more lines 491 to 494 to an adjacent line are different from each other. By looking at the scale 49, the user can easily grasp the remaining amount of the liquid adhesive 44 contained in the pen 45 that is mounted on the mounting portion 32 of the plotter 1. The distance to the adjacent line from each of the three or more lines 491 to 494 included in the scale 49 is shorter on the side of the pen 45 that is closer to the pen tip, in comparison to the side of the pen 45 that is farther from the pen tip. By looking at the scale 49 of the liquid adhesive 44, the user can easily grasp the remaining amount of the liquid adhesive 44 contained in the pen 45 that is mounted on the mounting portion 32 of the plotter 1. By looking at the scale 49, the user can estimate the distance of the line that can be drawn using the liquid adhesive 44, and an optimal value of the relative movement speed of the workpiece 20 with respect to the pen 45.

A plotter, a method for drawing with a pen containing a liquid using a plotter, and a pen mountable on a plotter of the present disclosure are not limited to the above-described embodiments, and various changes may be made without departing from the scope and spirit of the present disclosure. For example, the following modifications (A) and (B) may be made as appropriate.

(A) The configuration of the plotter 1 may be changed as appropriate. The plotter 1 need not necessarily be provided with the scanner portion, the display portion and the operation portion. The plotter 1 may be capable of performing processing (for example, cutting, sewing and the like of the workpiece) other than the drawing and the pressing. The plotter 1 may be configured such that the pen 45 can be mounted without using the cartridge 4. The cartridge with which the pen 45 can be mounted and the cartridge with which the pressing member 35 can be mounted may have different structures. The mounting portion 32 may be configured such that the pressing member 35 cannot be mounted thereon. The mounting portion 32 need not necessarily be configured such that a plurality of types of the pen 45 can be mounted thereon. The mounting portion 32 need not necessarily be configured such that a plurality of types of the pressing member 35 can be mounted thereon. The rear end portion of the pen 45 on the opposite side to the pen tip portion 47 may be usable as a pressing member. The plotter 1 may automatically change the pen 45 and the pressing member 35 that are mounted on the mounting portion 32. The display portion may be a display device other than the LCD. The configuration of the Y movement mechanism 7 and the X movement mechanism 8 may be changed as appropriate. For example, the plotter 1 may fix the position of the mounting portion 32 and may have a movement mechanism that allows movement of the workpiece 20 on the XY plane that intersects the Z direction. Alternatively, the plotter 1 may fix the position of the workpiece 20 and may have a movement mechanism that allows movement of the mounting portion 32 on the XY plane that intersects the Z direction. The workpiece 20 need not necessarily have a sheet shape.

(B) The respective steps of the drawing control processing and the pressing control processing are not limited to the example performed by the CPU 2, and a part or all of the steps may be performed by another electronic device (an ASIC, for example). The respective steps of the above-described processing may be performed through distributed processing by a plurality of electronic devices (a plurality of CPUs, for example). The respective steps of the drawing control processing and the pressing control processing of the above-described embodiments can be changed in order, omitted or added, if necessary. A case in which an operating system (OS) or the like that is operating on the plotter 1 performs part or all of actual processing on the basis of a command from the CPU 2 of the plotter 1 and the functions of the above-described embodiments are realized by the processing is also included in the scope of the present disclosure. For example, the following modifications (B-1) to (B-4) may be made, as appropriate, to the configuration of the pen 45, the configuration of the plotter 1, and the drawing control processing and the pressing control processing.

(B-1) The liquid contained in the pen 45 need not necessarily be the liquid adhesive. The plotter 1 may draw characters, lines and the like, instead of the pattern, and the pressing control processing may be omitted as appropriate. The plot data may be stored in the plotter 1 in advance, or may be acquired from an external device, such as the USB memory 60. The pen 45 need not necessarily have the scale 49. When the pen 45 has the scale 49, the intervals on the scale 49 may be changed as appropriate. For example, the intervals on the scale 49 may be equal intervals. The scale 49 of the pen 45 may include two or less lines. The pen 45 may be a marker-like pen. The entire circumference of the container portion 46 of the pen 45 need not necessarily be the window portion 48.

(B-2) The information relating to the remaining amount may be changed as appropriate. The information relating to the remaining amount need not necessarily be a numeric value. The CPU 2 need not necessarily set the movement speed such that the smaller the remaining amount of the liquid indicated by the information relating to the remaining amount, the slower the movement speed, in comparison to when the remaining amount is larger. The plotter 1 may use a detection portion to detect the remaining amount of the liquid contained in the pen 45. The plotter 1 may acquire, from the user, information as to whether a new pen has been mounted, and may acquire the remaining amount of the liquid by subtracting a use amount, as appropriate, on the basis of the length of the drawn line. In these cases, the input of the information relating to the remaining amount of the liquid need not necessarily be received from the user.

(B-3) The plotter 1 may store, in a storage portion, a mathematical expression that represents the correspondence between the numeric value representing the remaining amount of the liquid contained in the pen 45 and the movement speed corresponding to the numeric value. The storage portion may be a storage device other than the flash memory 74, such as an HDD, an SSD or the like. The storage portion may store the correspondence between the numeric value representing the remaining amount of the liquid contained in the pen 45 and the movement speed corresponding to the numeric value in the speed data storage area 741, for each of the types of the pen 45.

(B-4) The CPU 2 of the plotter 1 need not necessarily change the relative movement speed of the mounting portion 32 and the workpiece 20 in the course of the drawing processing. More specifically, in the drawing control processing in FIG. 4, the processing at step S19 and the processing from step S22 to step S26 may be omitted as appropriate. In the drawing control processing in FIG. 10, the processing from step S61 to step S63 may be omitted as appropriate. The plot data generated at step S39 may include only one of the drawing line data and the fill line data. Each of the drawing line and the fill line need not necessarily be set for each of the divided areas. The drawing order of the drawing line and the fill line may be changed as appropriate. The plot data generated at step S39 need not necessarily be the data instructing the drawing positions of the plurality of continuous line segments. For example, the plot data may be data instructing the drawing position of each of the plurality of line segments that extend at the interval set at step S42 in the first direction or the second direction inside the drawing area or the offset area. The CPU 2 may change the movement speed in the middle of the line segment. When the liquid is the liquid adhesive and the plot data includes the drawing line and the fill line, only when the drawing is performed in accordance with the drawing line data, the CPU 2 may relatively move the workpiece 20 and the mounting portion 32 at the reset movement speed from the start point of the line segment that is next in the drawing order, among the plurality of line segments. In other words, the CPU 2 may change the generation method of the plot data (the first data) in accordance with the type of the liquid. The CPU 2 may set the threshold value at step S23 to the same value, irrespective of the remaining amount of the liquid indicated by the information relating to the remaining amount.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A plotter comprising:
   a mounting portion configured to mount with a pen containing a liquid;
   a first movement mechanism configured to relatively move the mounting portion and a workpiece in a movement direction, the movement direction being a direction for the mounting portion and the workpiece to move close to and away from each other;
   a second movement mechanism configured to relatively move the mounting portion and the workpiece in a direction intersecting the movement direction by the first movement mechanism;
   a processor; and
   a memory configured to store computer-readable instructions that, when executed by the processor, instruct the processor to perform processes comprising:
   acquiring plot data instructing a position at which drawing is performed on the workpiece using the pen;
   acquiring information relating to a remaining amount of the liquid of the pen;
   setting a relative movement speed of the mounting portion and the workpiece by the second movement mechanism, on the basis of the acquired information relating to the remaining amount; and
   controlling the first movement mechanism and the second movement mechanism on the basis of the acquired plot data and the set movement speed, relatively moving the workpiece and the mounting portion at the movement speed, and performing drawing on the workpiece.

2. The plotter according to claim 1, wherein
   the setting of the movement speed includes setting the movement speed slower when the remaining amount of the liquid indicated by the acquired information relating to the remaining amount is smaller than when the remaining amount is larger.

3. The plotter according to claim 1, further comprising:
   an input portion configured to receive, from a user, an input of the information relating to the remaining amount of the liquid of the pen,
   wherein
   the acquiring of the information relating to the remaining amount includes acquiring the information relating to the remaining amount input via the input portion.

4. The plotter according to claim 1, further comprising:
   a storage portion configured to store a correspondence between a numeric value representing the remaining amount of the liquid stored in the pen and the movement speed,
   wherein
   the acquiring of the information relating to the remaining amount includes acquiring the numeric value representing the remaining amount as the information relating to the remaining amount, and the setting of the movement speed includes referring to the storage portion and setting the movement speed corresponding to the acquired numeric value representing the remaining amount.

5. The plotter according to claim 1, wherein
the setting of the movement speed includes resetting the movement speed in accordance with a distance of the line drawn from when the drawing is started to when the drawing is ended in accordance with the plot data, and
the drawing on the workpiece includes drawing on the workpiece by relatively moving the workpiece and the mounting portion at the reset movement speed when the movement speed is reset.

6. The plotter according to claim 5, wherein
the computer-readable instructions further instruct the processor to perform a process comprising:
identifying a distance of a line drawn on the workpiece, and
the setting of the movement speed includes resetting the movement speed to be slower than the currently set movement speed when the identified distance exceeds a threshold value.

7. The plotter according to claim 6, wherein
the plot data includes data instructing drawing positions of a plurality of continuous line segments, and
when the identified distance reaches the threshold value, the second movement mechanism relatively moves the workpiece and the mounting portion at the reset movement speed from a start point of a next line segment in a drawing order, among the plurality of line segments.

8. The plotter according to claim 6, wherein
the larger the remaining amount of the liquid, the larger the threshold value, m comparison to when the remaining amount of the liquid indicated by the information relating to the remaining amount is smaller.

9. The plotter according to claim 5, wherein
the plot data includes data instructing drawing positions of a plurality of continuous line segments, and
the computer-readable instructions further instruct the processor to perform processes comprising:
identifying, from among the plurality of line segments, a line segment at which a distance of a line drawn on the workpiece reaches a threshold value, when drawing is performed in accordance with the plot data, before starting the drawing in accordance with the plot data, and
the setting of the movement speed includes resetting the movement speed to be slower than the currently set movement speed when the identified line segment is drawn.

10. A method for drawing with a pen containing a liquid using a plotter, the method comprising:
a process of acquiring plot data instructing a position to draw on a workpiece using the pen containing the liquid;
a process of acquiring information relating to a remaining amount of the liquid of the pen;
a process of setting a relative movement speed of a mounting portion and the workpiece, on the basis of the acquired information relating to the remaining amount, the mounting portion being configured to mount with the pen containing the liquid; and
a process of controlling a first movement mechanism and a second movement mechanism on the basis of the acquired plot data and the set movement speed, relatively moving the workpiece and the mounting portion at the movement speed, and performing drawing on the workpiece, the first movement mechanism being configured to relatively move the mounting portion and the workpiece in a movement direction, the movement direction being a direction for the mounting portion and the workpiece to move close to and away from each other, and the second movement mechanism being configured to relatively move the mounting portion and the workpiece in a direction intersecting the movement direction by the first movement mechanism.

11. A pen mountable on a plotter, comprising:
a container portion containing a liquid adhesive;
a window portion configured to allow visual recognition of a remaining amount of the liquid adhesive; and
a scale provided on the window portion and indicating the remaining amount of the liquid adhesive, wherein
the scale includes at least three lines, and
respective distances from each of the at least three lines to an adjacent line are different from each other.

12. The pen according to claim 11, wherein
the distance is shorter on a side of the pen closer to a pen tip, in comparison to a side of the pen farther from the pen tip.

* * * * *